(12) United States Patent
Miyoshi

(10) Patent No.: US 7,542,433 B2
(45) Date of Patent: Jun. 2, 2009

(54) TRANSMISSION APPARATUS AND COMMUNICATION MODE SELECTION TABLE UPDATING METHOD

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 749 days.

(21) Appl. No.: 10/488,754

(22) PCT Filed: Jun. 25, 2003

(86) PCT No.: PCT/JP03/08023

§ 371 (c)(1),
(2), (4) Date: Mar. 9, 2004

(87) PCT Pub. No.: WO2004/004165

PCT Pub. Date: Jan. 8, 2004

(65) Prior Publication Data

US 2004/0248520 A1 Dec. 9, 2004

(30) Foreign Application Priority Data

Jun. 28, 2002 (JP) .............................. 2002-189881
Aug. 20, 2002 (JP) .............................. 2002-238820
Jun. 3, 2003 (JP) .............................. 2003-158416

(51) Int. Cl.
*H04L 12/28* (2006.01)
*H04J 3/22* (2006.01)

(52) U.S. Cl. ...................... 370/255; 370/465

(58) Field of Classification Search ............... 370/252, 370/465, 255, 229, 241, 261, 437
See application file for complete search history.

(56) References Cited

U.S. PATENT DOCUMENTS

| | | | | |
|---|---|---|---|---|
| 5,603,096 A | * | 2/1997 | Gilhousen et al. | 455/69 |
| 5,701,294 A | * | 12/1997 | Ward et al. | 370/252 |
| 6,070,085 A | * | 5/2000 | Bender et al. | 455/522 |
| 6,700,881 B1 | * | 3/2004 | Kong et al. | 370/335 |

(Continued)

FOREIGN PATENT DOCUMENTS

DE 19909921 9/2000

(Continued)

OTHER PUBLICATIONS

PCT International Search Report dated Oct. 14, 2003.

(Continued)

*Primary Examiner*—Brenda Pham
*Assistant Examiner*—Mon Cheri S Davenport
(74) *Attorney, Agent, or Firm*—Dickinson Wright, PLLC

(57) ABSTRACT

A transmission apparatus and method for updating a communication mode selection table that updates a communication mode selection table correctly and selects an optimal MCS according to an actual channel condition. A buffer (104) temporarily stores calibration data to be transmitted for updating a table (148). A scheduler (106) performs scheduling of data to be transmitted based on a CIR on a downlink reported from a plurality of communication terminal apparatuses. When there is no data to be transmitted, the scheduler (106) sends calibration data from the buffer (104). When calibration data is transmitted as a result of the scheduling, the scheduler (106) notifies an address information generation section (112) of the communication terminal apparatus to which the calibration data is transmitted.

17 Claims, 21 Drawing Sheets

U.S. PATENT DOCUMENTS

| | | | |
|---|---|---|---|
| 6,940,915 B2 * | 9/2005 | Tang | 375/261 |
| 7,035,231 B2 * | 4/2006 | Yu et al. | 370/318 |
| 2002/0136271 A1 * | 9/2002 | Hiramatsu et al. | 375/141 |
| 2003/0022629 A1 | 1/2003 | Miyoshi et al. | |
| 2004/0022176 A1 | 2/2004 | Hashimoto et al. | |

FOREIGN PATENT DOCUMENTS

| | | |
|---|---|---|
| JP | 11234241 | 8/1999 |
| JP | 200226808 | 1/2002 |
| JP | 200264424 | 2/2002 |
| JP | 2002232943 | 8/2002 |
| JP | 200332745 | 1/2003 |
| WO | 0047006 | 8/2000 |
| WO | WO 00/47006 | * 10/2000 |

OTHER PUBLICATIONS

Supplementary European Search Report dated Aug. 23, 2006.

* cited by examiner

| CIR | MCS |
|---|---|
| ~a | MCS1 |
| a~b | MCS2 |
| b~c | MCS3 |
| c~ | MCS4 |

| MCS | MODULATION SCHEME | CODING RATE |
|---|---|---|
| MCS1 | QPSK | 1/2 |
| MCS2 | QPSK | 3/4 |
| MCS3 | 16QAM | 1/2 |
| MCS4 | 16QAM | 3/4 |

| VALUE | INFORMATION |
|---|---|
| 0 | CAL |
| 1 | MCS1 |
| 2 | MCS2 |
| 3 | MCS3 |
| 4 | MCS4 |

FIG.15

TRANSMISSION APPARATUS AND COMMUNICATION MODE SELECTION TABLE UPDATING METHOD

TECHNICAL FIELD

The present invention relates to a transmission apparatus and a method for updating a communication mode selection table.

BACKGROUND ART

In order to transmit data in, for example, HSDPA (High Speed Downlink Packet Access) while satisfying a desired error rate according to channel quality, adaptive modulation is under study in recent years, which measures transmission quality such as a CIR (Carrier to Interference Ratio), selects a communication mode (MCS: Modulation Coding Schemes) made up of a modulation scheme and error coding scheme based on the measured transmission quality and transmits data according to the modulation scheme and error coding scheme of the selected MCS.

For selection of MCS, a predetermined communication mode (MCS) selection table (hereinafter referred to as "table") is used. The table is provided the correspondence between transmission quality such as a CIR and an error rate such as packet error rate (PER) and bit error rate (BER) for each MCS as shown in FIG. 1A, for example. That is, in FIG. 1A, in order to satisfy a desired error rate R, it is necessary to select MCS1 when a CIR is below a threshold a, select MCS2 when the CIR is equal to or higher than the threshold a and lower than a threshold b, select MCS3 when the CIR is equal to or higher than the threshold b and lower than a threshold c and select MCS4 when the CIR is equal to or higher than the threshold c. Therefore, the table in this case appears as shown in FIG. 1B, for example.

In the selection of MCS for data transmission, MCS which can satisfy a desired error rate is selected based on the measured transmission quality with reference to this table.

As described above, the table is based on the correspondence between the transmission quality and error rate for each MCS, but when, for example, an error occurs in a CIR measuring circuit and transmission quality cannot be measured accurately or when there is an influence from a propagation environment, the correspondence between the transmission quality and error rate may be different from the actual correspondence between the transmission quality and error rate. For this reason, the table becomes inaccurate, making it impossible to select an optimal MCS for data transmission.

To prevent such a situation, for example, the Unexamined Japanese Patent Publication No. 2002-64424 discloses a method of updating the table with correct data. This method measures transmission quality of received data, detects whether this transmission quality is different from desired transmission quality or not and rewrites the correspondence between the transmission quality and error rate when a difference is detected and updates the table.

However, the above described conventional method rewrites the table based on transmission quality of received data, and has a problem that when an amount of received data is small, it is not possible to measure the transmission quality of the received data accurately, failing to update the table correctly.

More specifically, when a base station apparatus is carrying out scheduling and data transmission to a plurality of communication terminal apparatuses, if data cannot be transmitted to a specific communication terminal apparatus, it is not possible to measure transmission quality of the communication terminal apparatus and not possible to update the table for selecting MCS of the data corresponding to the communication terminal apparatus. That is, when, for example, scheduling is performed and data is transmitted for four communication terminal apparatuses A to D as shown in FIG. 2, data 10 and data 20 are transmitted to the communication terminal apparatus D. But after data 10 is transmitted until data 20 is transmitted, the communication terminal apparatus D receives no data and cannot thereby measure transmission quality. Therefore, it is not possible to detect a difference between desired transmission quality and actual transmission quality during this period as with the above described conventional art.

Furthermore, as described above, the table is based on the correspondence between a CIR and error rate for each MCS, but if the period during which data is transmitted with a specific MCS is long, the MCS of received data is always the same and it is therefore impossible to update the correspondence between a CIR and error rate about other MCS.

When the table cannot be updated in this way, the correspondence between the CIR and error rate in the table may differ a great deal from the actual correspondence, which results in a problem that it is not possible to select an optimal MCS according to an actual channel condition.

DISCLOSURE OF INVENTION

It is an object of the present invention to update a communication mode selection table correctly and select an optimal MCS according to the actual channel condition.

An essence of the present invention is that a base station apparatus transmits calibration data for updating a communication mode selection table and the communication mode selection table is updated using transmission quality such as an error rate and throughput of this calibration data.

According to one aspect of the present invention, a transmission apparatus in a radio communication system using a communication mode selection table for selecting a communication mode according to a channel condition comprises a transmission section that transmits calibration data for updating the communication mode selection table and a decision section that decides a communication mode for transmitting data based on the communication mode selection table updated according to the transmission quality when the transmitted calibration data is transmitted through a communication channel.

According to another aspect of the present invention, a method for updating a communication mode selection table in a radio communication system using a communication mode selection table for selecting a communication mode according to a channel condition comprises a step of transmitting calibration data for updating the communication mode selection table and a step of updating the communication mode selection table based on the transmission quality when the transmitted calibration data is transmitted through a communication channel.

BRIEF DESCRIPTION OF DRAWINGS

FIG. 6 illustrates an example of MCS according to Embodiment 1;

FIG. 10A illustrates an example of a data slot configuration;

FIG. 10B illustrates an example of a data slot configuration according to Embodiment 2;

FIG. 15 illustrates an example of MCS information according to Embodiment 4;

BEST MODE FOR CARRYING OUT THE INVENTION

With reference now to the attached drawings, embodiments of the present invention will be explained in detail below. In the following explanations, MCS will be taken as an example of a communication mode.

Embodiment 1

Figures 1A, 1B:
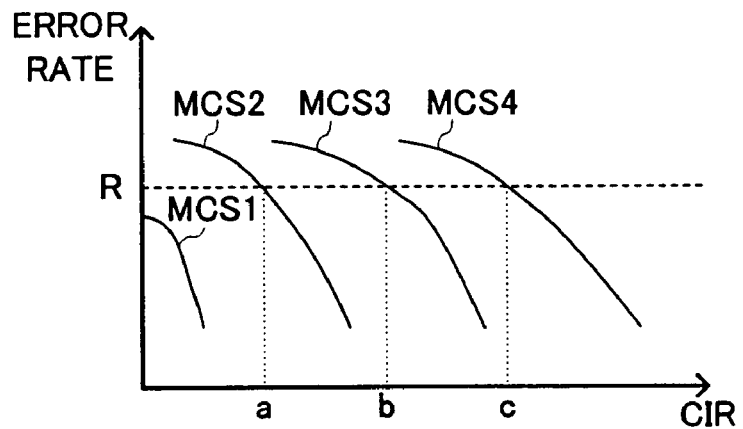
FIG. 1A illustrates an example of a relationship between an error rate and transmission quality.
FIG. 1B illustrates an example of a communication mode selection table.
Figure 2:
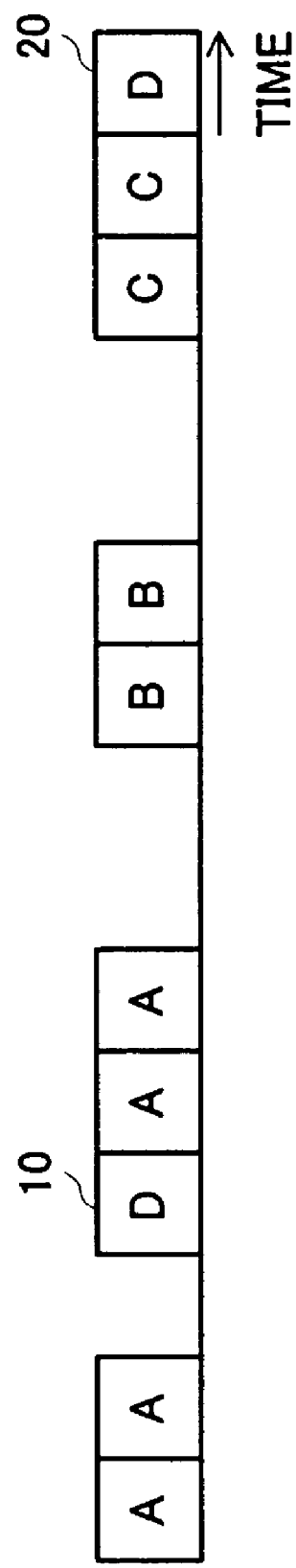
FIG. 2 illustrates an example of a conventional data slot configuration.
Figure 3A:
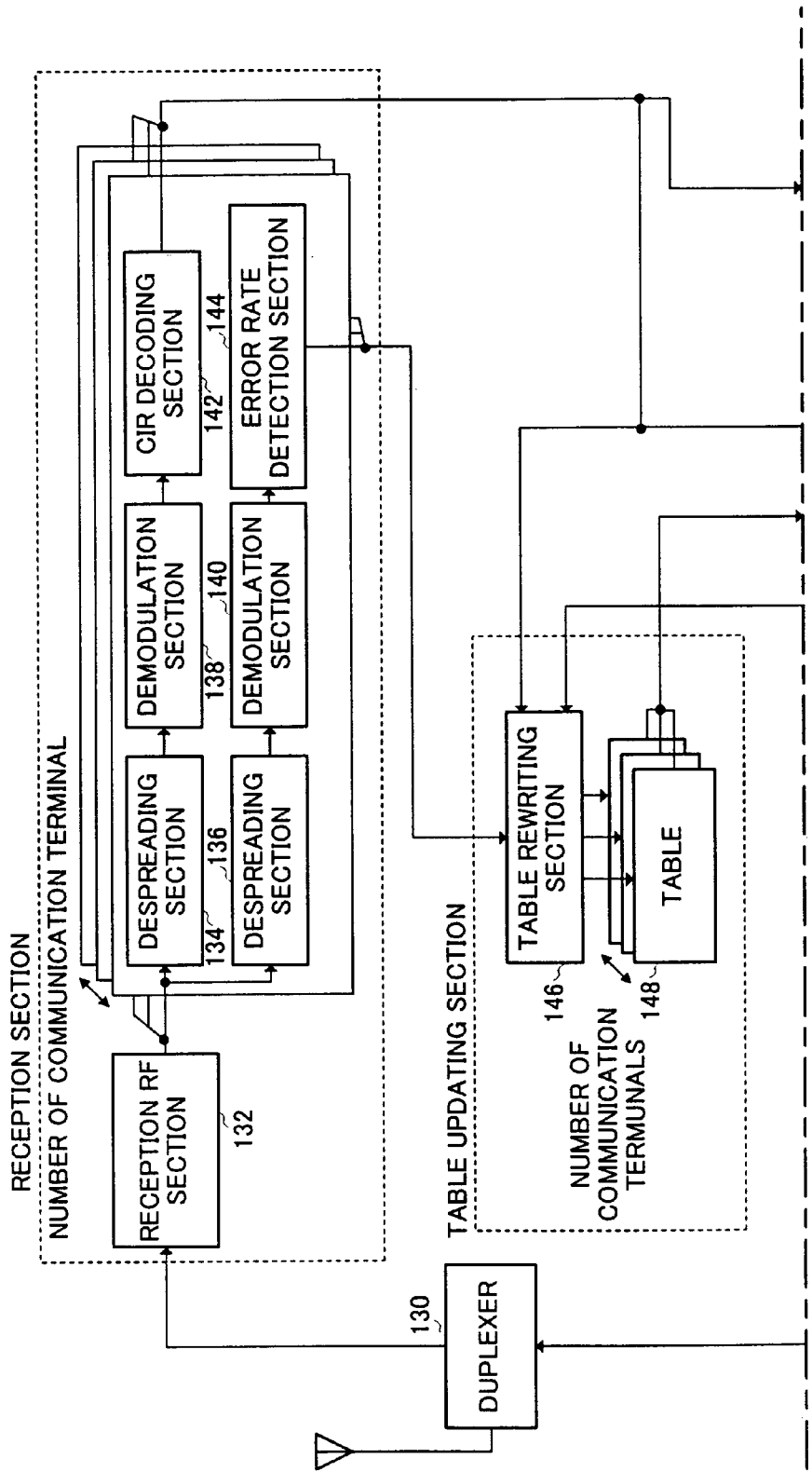
FIG. 3A is a block diagram showing a configuration of a base station apparatus according to Embodiment 1 of the present invention.
Figure 3B:
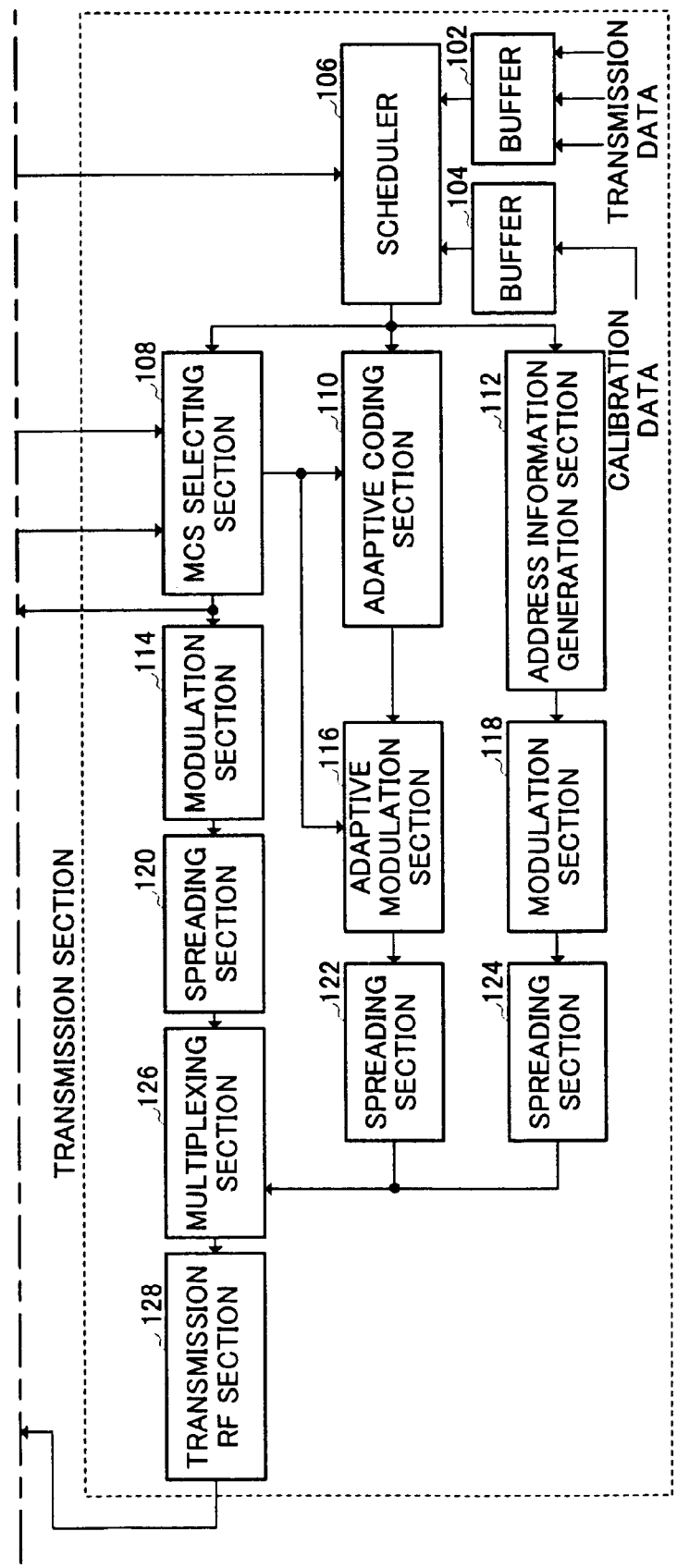
FIG. 3B illustrates a continuation of FIG. 3A.

FIG. 3A and FIG. 3B are block diagrams showing a configuration of a base station apparatus according to Embodiment 1 of the present invention. The base station apparatus shown in FIG. 3A and FIG. 3B is constructed of a transmission section, a reception section and a table updating section.

The transmission section is constructed of a buffer 102, a buffer 104, a scheduler 106, an MCS selection section 108, an adaptive coding section 110, an address information generation section 112, a modulation section 114, an adaptive modulation section 116, a modulation section 118, a spreading section 120, a spreading section 122, a spreading section 124, a multiplexing section 126, and a transmission RF (Radio Frequency) section 128.

The buffer 102 temporarily stores data to be transmitted when the data is transmitted according to scheduling by the scheduler 106. The buffer 104 temporarily stores calibration data to be transmitted for updating a table (MCS selection table) 148 which will be described later.

The scheduler 106 carries out scheduling of data to be transmitted based on a CIR of the downlink reported from a plurality of communication terminal apparatuses. Furthermore, the scheduler 106 causes the buffer 104 to transmit calibration data when there is no data to be transmitted. As a result of the scheduling, the scheduler 106 notifies the MCS selection section 108 to which communication terminal apparatus the data is to be transmitted, outputs data to the communication terminal apparatus to the adaptive coding section 110 and notifies the address information generation section 112 to which communication terminal apparatus the calibration data is to be transmitted when calibration data is transmitted.

Here, the internal configuration of the scheduler 106 will be explained using FIG. 4.

Figure 4:
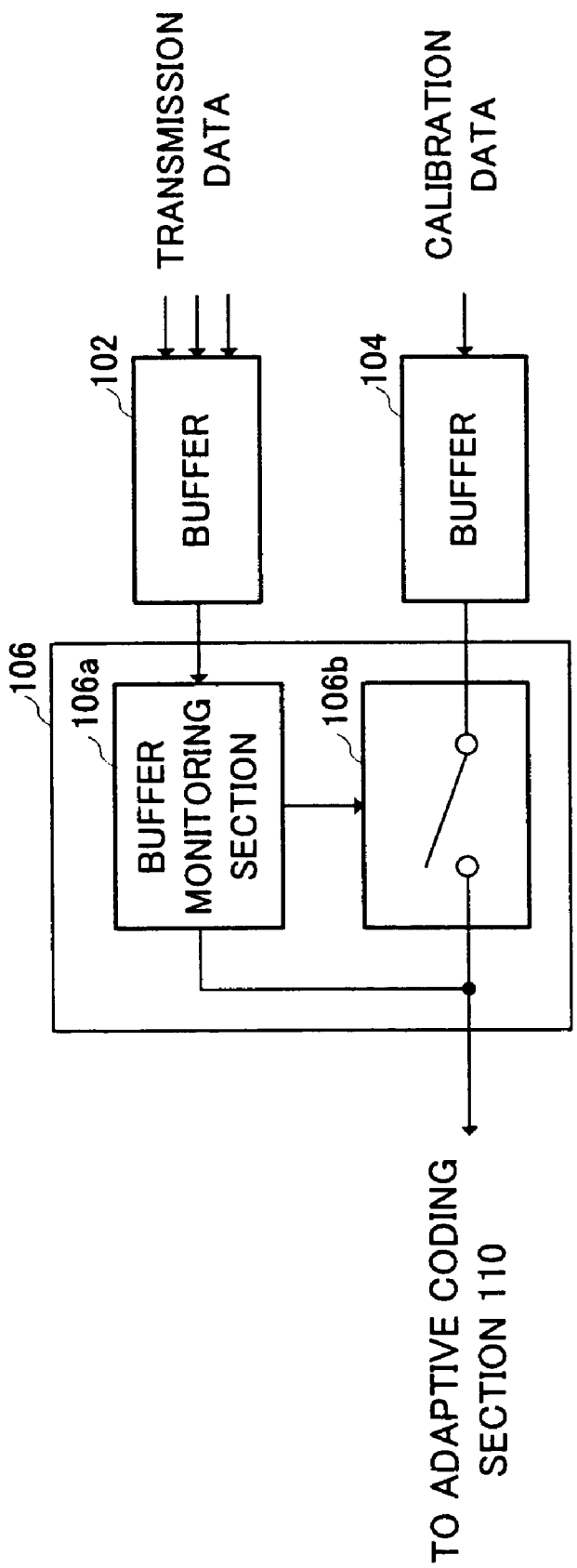
FIG. 4 is a block diagram showing a configuration of a scheduler according to Embodiment 1.

As shown in FIG. 4, the scheduler 106 includes a buffer monitoring section 106a and a switch 106b. The buffer monitoring section 106a monitors the buffer 102 and sets the switch 106b to a connection position when no transmission data is stored in the buffer 102. The switch 106b is normally not in the connection position and when set to the connection position by the buffer monitoring section 106a, the switch 106b sends the calibration data stored in the buffer 104 to the adaptive coding section 110.

With reference to FIG. 3A and FIG. 3B again, the configuration of the base station apparatus according to this embodiment will be explained.

Based on the CIR reported from the communication terminal apparatus to which data is to be transmitted and a table 148 (which will be described later) corresponding to the communication terminal apparatus, the MCS selection section 108 selects MCS in such a way that the error rate of the communication terminal apparatus becomes a desired error rate. Furthermore, when the calibration data is transmitted, the MCS selection section 108 selects MCS in a predetermined order. The MCS selection section 108 informs the coding rate and modulation scheme of the selected MCS to the adaptive coding section 110 and adaptive modulation section 116 respectively and notifies the modulation section 114 and table rewriting section 146 that the MCS has been selected. The adaptive coding section 110 error-codes the transmission data or calibration data at the coding rate of the MCS selected by the MCS selection section 108. The address information generation section 112 generates information on the address of the calibration data notified from the scheduler 106.

The modulation section 114 modulates the information on the MCS selected by the MCS selection section 108 (hereinafter referred to as "MCS information"). The adaptive modulation section 116 modulates the transmission data or calibration data according to the modulation scheme of the MCS selected by the MCS selection section 108. The modulation section 118 modulates the address information generated by the generation section 112. The spreading section 120 spreads the MCS information. The spreading section 122 spreads the transmission data or calibration data. The spreading section 124 spreads the address information. The multiplexing section 126 multiplexes the MCS information, transmission data or calibration data and address information. The transmission RF section 128 carries out predetermined radio transmission processing (D/A conversion, up-conversion, etc.) on the multiplexed signal output from the multiplexing section 126 and transmits the signal from the duplexer 130 through an antenna.

The reception section is constructed of a reception RF section 132, a despreading section 134, a despreading section 136, a demodulation section 138, a demodulation section 140, a CIR decoding section 142 and an error rate decoding section 144. Of these sections, there are as many despreading sections 134, despreading sections 136, demodulation sections 138, demodulation sections 140, CIR decoding sections 142 and error rate decoding sections 144 as communication terminal apparatuses with which the base station apparatus of this embodiment communicates.

The reception RF section 132 carries out predetermined radio reception processing (down-conversion, A/D conversion, etc.) on a received signal received from the antenna through the duplexer 130. The despreading section 134 despreads the information on the CIR of the downlink measured by the communication terminal apparatus included in the received signal. The despreading section 136 despreads the information on the error rate of the data transmitted on the downlink included in the received signal.

The demodulation section 138 demodulates the information on the CIR of the downlink. The demodulation section 140 demodulates the information on the error rate of the downlink.

The CIR decoding section 142 decodes the information on the CIR of the downlink and notifies the CIR obtained to the scheduler 106, MCS selection section 108 and table rewriting section 146. The error rate decoding section 144 decodes the information on the error rate of the data transmitted on the downlink and notifies the error rate obtained to the table rewriting section 146.

The table updating section is constructed of the table rewriting section 146 and the table 148. Of these, there are as many tables 148 as communication terminal apparatuses with which the base station apparatus of this embodiment communicates.

The table rewriting section 146 compares the error rate corresponding to each communication terminal apparatus with a predetermined threshold and when the table 148 needs to be updated as a result of the comparison or when the CIR of the calibration data and error rate are reported, the table rewriting section 146 rewrites the table 148 corresponding to the communication terminal apparatus which has reported the error rate. Here, examples of cases where the table 148 needs to be updated include a case where the error rate actually reported from the communication terminal apparatus does not satisfy the desired error rate although the MCS capable of satisfying the desired error rate has been selected from the table 148 and the transmission data has been transmitted. Furthermore, that the error rate does not satisfy the desired error rate specifically means that although the table has been created in such a way that the error rate becomes 10%, the error rate falls below 10%, for example, 1% or contrarily the error rate exceeds 10%, for example, 20% when the data is actually transmitted.

Furthermore, when rewriting the table 148, the table rewriting section 146 rewrites the correspondence between the CIR and the error rate according to the MCS notified from the MCS selection section 108 (that is, MCS used for data transmission) based on the CIR decoded by the CIR decoding section 142 and the error-rate de-coded by the error rate decoding section 144 (that is, the CIR and error rate reported from the communication terminal apparatus).

The table 148 is provided for each communication terminal apparatus with which the base station apparatus of this embodiment communicates and shows an MCS which can satisfy a desired error rate associated with a CIR as in the case of the prior art.

In this embodiment, the table 148 is updated based on the data error rate (e.g., PER, BER or frame error rate (FER), etc.), but in addition to this, the embodiment may also be adapted in such a way that the table 148 is updated based on the result of a comparison between an index indicating transmission quality of data on the downlink such as a throughput and delay with a predetermined threshold. In these cases, information such as a throughput and delay time is fed back from the station at the other end and it is then decided whether the table 148 should be updated or not.

Figure 5:
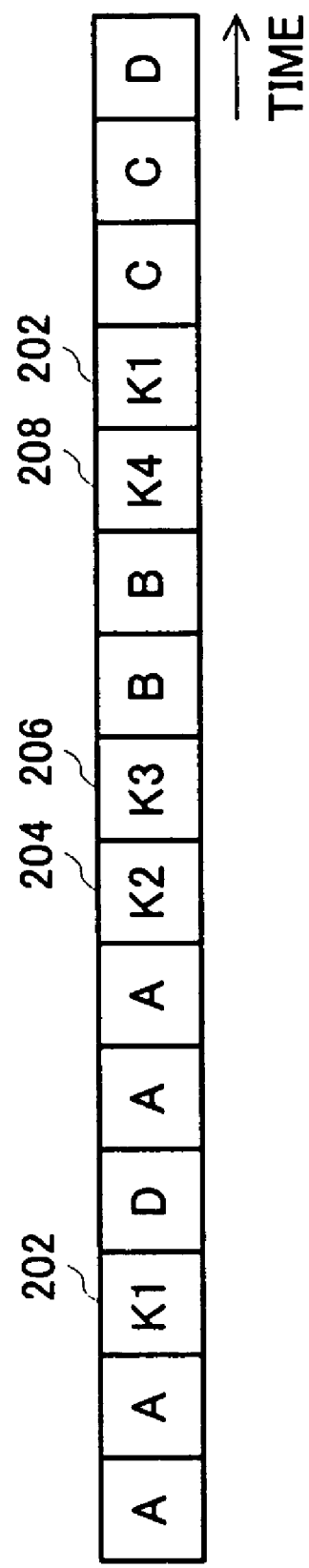
FIG. 5 illustrates an example of a data slot configuration according to Embodiment 1.

Then, the operation of the base station apparatus in the above described configuration will be explained using specific examples using FIG. 5 to FIG. 7.

First, transmission of calibration data will be explained using FIG. 5.

As described above, the scheduler 106 carries out scheduling with data to be transmitted assigned to slots based on the CIR of the downlink reported from each communication terminal apparatus which becomes the station at the other end. As a result of the scheduling, the data to be transmitted is stored in the buffer 102 temporarily.

For example, when the base station apparatus of this embodiment carries out communications with communication terminal apparatuses A to D, suppose data is assigned to slots of the communication terminal apparatuses in order of A, A, (none), D, A, A, (none), (none), B, B, (none), (none), C, C, D and transmitted, then the buffer 102 stores the respective pieces of data in the above described order temporarily. Here, "(none)" means that there is no transmission data to be transmitted and the slot becomes empty. Suppose the buffer 102 is empty at this time.

Here, the buffer monitoring section 106a in the scheduler 106 monitors the buffer 102 all the time and sets the switch 106b to a connection position when the buffer 102 becomes empty (that is, in the case of (none) above).

In this way, when there is no transmission data to be transmitted, calibration data is transmitted from the buffer 104. In other words, calibration data is assigned to the slot which becomes empty as a result of the scheduling. Therefore, data is output from the scheduler 106 to the adaptive coding section 110 sequentially starting from the data on the left side with respect to the plane of the sheet in FIG. 5. In FIG. 5, data 202, data 204, data 206, and data 208 denote calibration data.

Furthermore, the data 202 is transmitted according to the modulation scheme (QPSK) and coding rate (½) of MCS1 shown in FIG. 6, the data 204 is likewise transmitted according to the modulation scheme (QPSK) and coding rate (¾) of MCS2 shown in FIG. 6, the data 206 is transmitted according to the modulation scheme (16QAM) and coding rate (½) of MCS3 and the data 208 is transmitted according to the modulation scheme (16QAM) and coding rate (¾) of MCS4.

These MCSs are selected by the MCS selection section 108, the coding rates and modulation schemes of the selected MCSs are used by the adaptive coding section 110 and adaptive modulation section 116 and calibration data is thereby error-coded and modulated. Then, the calibration data is spread by the spreading section 122. Furthermore, the information on the MCS (MCS information) selected by the MCS selection section 108 is notified to the table rewriting section 146 and at the same time modulated by the modulation section 114 and spread by the spreading section 120.

Here, it is assumed that as MCSs when calibration data is transmitted, MCS1, MCS2, MCS3 and MCS4 are selected in that order as shown in FIG. 6, but it is also possible, for example, for a communication terminal apparatus to transmit an MCS request signal for requesting transmission of calibration data according to a specific MCS and for the base station apparatus to transmit calibration data according to the requested MCS.

As the calibration data, it is possible to use data made up of a random string and an error detection code, known data such as a PN (Pseudo Noise) string and advertisement data, etc.

Of these types of data, when a random string and error detection code are used, the communication terminal apparatus which receives the calibration data can correctly detect a PER (packet error rate) as the error rate.

Furthermore, when known data such as a PN string is used, the communication terminal apparatus can detect not only a PER but also a BER (bit error rate) which is a bitwise error rate correctly.

Moreover, when the communication terminal apparatus uses advertisement data which is not always required, it is possible to update the table and effectively use empty slots as well.

Furthermore, by transmitting the calibration data assigned to empty slots in this way, the base station apparatus always transmits signals with fixed power.

This makes constant an amount of interference given to an adjacent cell by the cell in which the base station apparatus of the present invention is located and the adjacent cell can carry out stable communications.

This is for the following reason. That is, when the amount of interference from the adjacent cell varies from one slot to another, the CIR measured by the communication terminal apparatus varies accordingly, and therefore when an MCS is selected based on the CIR, there may be a difference in the amount of interference when the CIR is measured and when the MCS is selected. For this reason, the selected MCS may not always be an optimal MCS for data transmission, whereas when the amount of interference from the adjacent cell is constant, the measured value of the CIR is also substantially constant and therefore an optimal MCS can be selected.

Furthermore, the scheduler 106 notifies the address of the calibration data to the address information generation section 112. The address of the calibration data may be all communication terminal apparatuses which communicate with the base station apparatus or may also be a communication terminal apparatus which has requested a specific MCS when an MCS request signal is used as described above.

Then, the address information generation section 112 generates address information, the address information is modulated by the modulation section 118 and spread by the spreading section 124. The MCS information, calibration data and address information after the spreading are multiplexed by the multiplexing section 126, subjected to predetermined radio transmission processing (D/A conversion, up-conversion, etc.) by the transmission RF section 128 and transmitted from the antenna through the duplexer 130. The MCS information and address information are transmitted through a control channel and calibration data is transmitted through a data channel.

The calibration data transmitted is received by a communication terminal apparatus (not shown) which is included in the address information and the communication terminal apparatus (not shown) demodulates and decodes the calibration data based on the MCS information and transmits a broadcasting signal including a CIR which is transmission quality of the downlink and an error rate of the calibration data to the base station apparatus.

The broadcasting signal including the CIR and error rate transmitted from the communication terminal apparatus is received from the antenna through the duplexer 130 and subjected to predetermined radio reception processing (down-conversion, A/D conversion, etc.) by the reception RF section 132. Then, the received signal is despread by the despreading section 134 and despreading section 136 provided for each communication terminal apparatus. Then, the received signal is demodulated by the demodulation section 138, decoded by the CIR decoding section 142, the CIR obtained is notified to the scheduler 106, MCS selection section 108 and table rewriting section 146.

On the other hand, the signal despread by the despreading section 136 is demodulated by the demodulation section 140, decoded by the error rate decoding section 144 and the error rate obtained is notified to the table rewriting section 146. Then, the table rewriting section 146 updates the correspondence between the CIR and the error rate according to the MCS notified from the MCS selection section 108 (that is, MCS used for transmission of calibration data) based on the CIR notified from the CIR decoding section 142 and the error rate notified from the error rate decoding section 144 (that is, actual CIR and error rate of calibration data) and then updates the table 148 corresponding to the communication terminal apparatus which has transmitted the broadcasting signal.

Thus, according to this embodiment, when an empty slot is produced as a result of scheduling, calibration data for updating the MCS selection table is assigned to the empty slot and transmitted, and therefore it is possible for the communication terminal apparatus to report the transmission quality and error rate of the downlink to the base station apparatus and for the base station apparatus to correctly update the MCS selection table according to the reported transmission quality and error rate and select an optimal MCS according to the actual channel condition.

Figure 7:
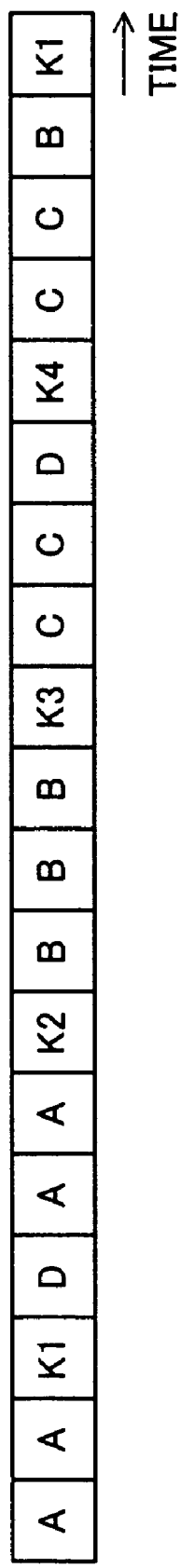
FIG. 7 illustrates another example of the data slot configuration according to Embodiment 1.

In this embodiment, the base station apparatus inserts calibration data in an empty slot and transmits the data, but as shown in FIG. 7, it is also possible to ensure that calibration data is inserted in units of a predetermined number of slots (4-slot unit in FIG. 7) and transmitted. In this way, calibration data is transmitted periodically, making sure that the MCS selection table is updated.

Embodiment 2

A feature of Embodiment 2 of the present invention is that a communication terminal apparatus transmits calibration data using an empty slot and selects MCS in an uplink communication.

Figure 8A:
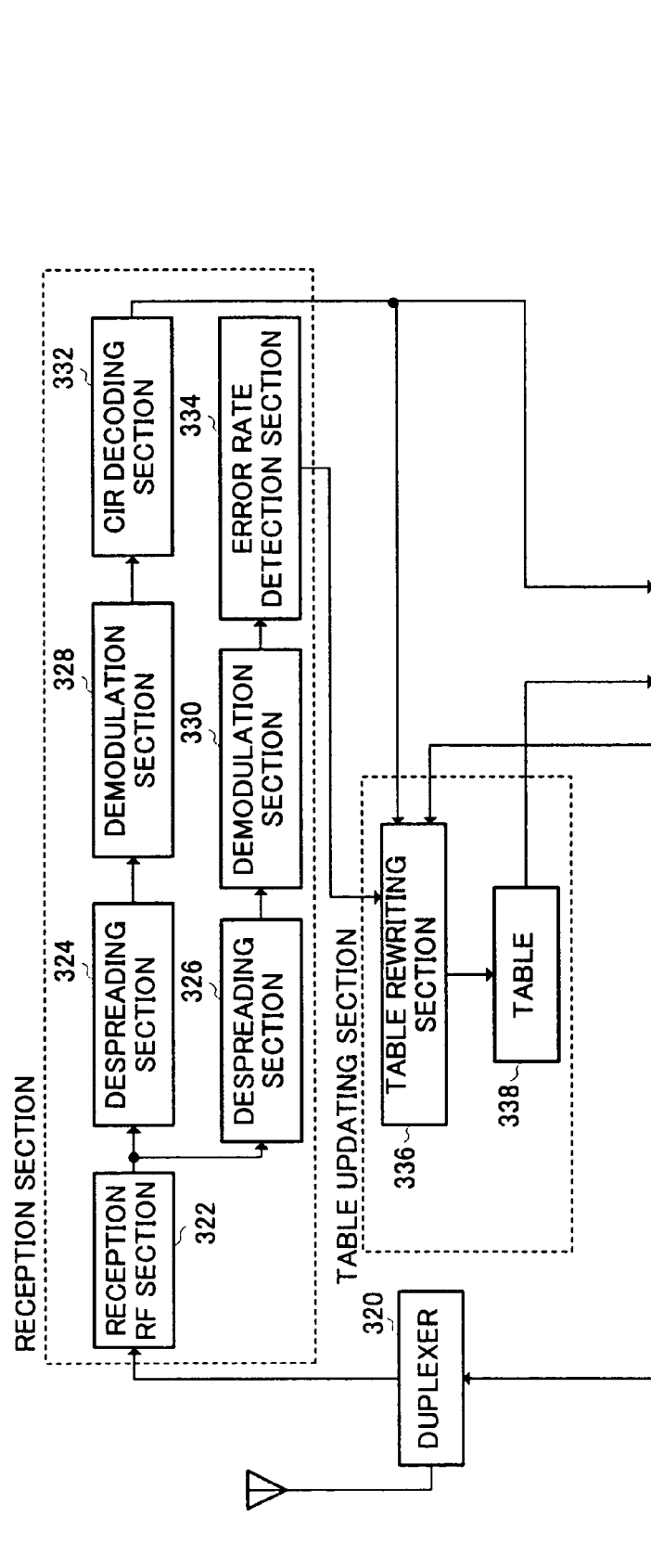
FIG. 8A is a block diagram showing a configuration of a communication terminal apparatus according to Embodiment 2 of the present invention.
Figure 8B:
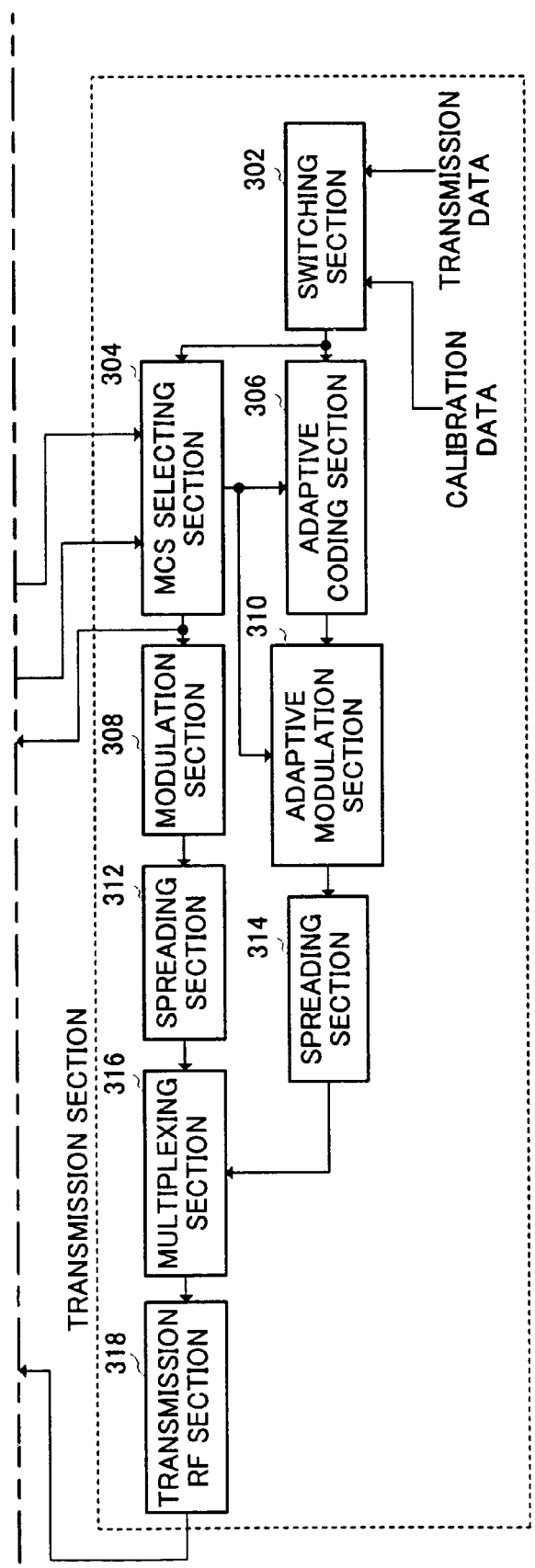
FIG. 8B illustrates a continuation of FIG. 8A.

FIG. 8A and FIG. 8B are block diagrams showing a configuration of a communication terminal apparatus according to Embodiment 2. The communication terminal apparatus in FIG. 8A and FIG. 8B is constructed of a transmission section, a reception section and a table updating section.

The transmission section is constructed of a switching section 302, an MCS selection section 304, an adaptive coding section 306, a modulation section 308, an adaptive modulation section 310, a spreading section 312, a spreading section 314, a multiplexing section 316 and a transmission RF section 318.

The switching section 302 switches between transmission data and calibration data and outputs the data to the adaptive coding section 306. More specifically, when there is no transmission data to be transmitted, the switching section 302 outputs calibration data. Furthermore, when calibration data is output, the switching section 302 notifies it to the MCS selection section 304.

Here, the internal configuration of the switching section 302 will be explained using FIG. 9.

Figure 9:
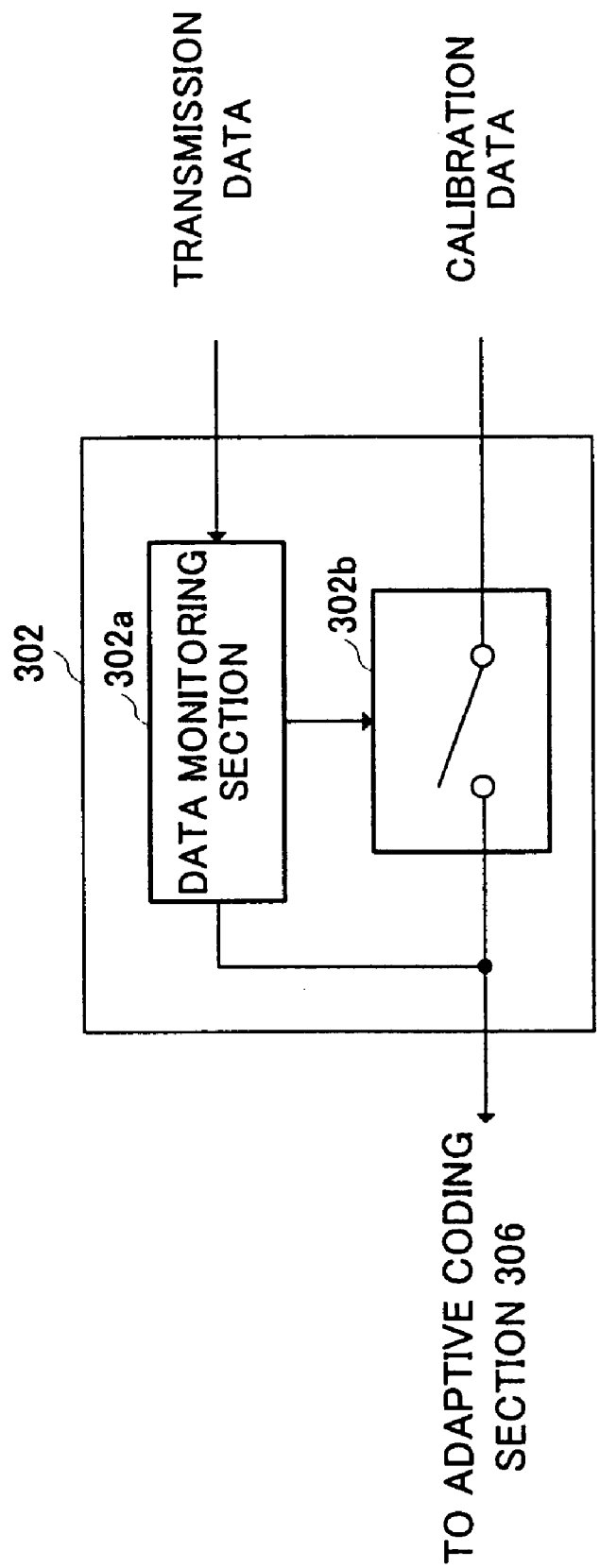
FIG. 9 is a block diagram showing a configuration of a switching section according to Embodiment 2.

As shown in FIG. 9, the switching section 302 includes a data monitoring section 302a and a switch 302b. The data monitoring section 302a always monitors transmission data and sets the switch 302b to a connection position when there is no transmission data to be transmitted.

The switch 302b is normally disconnected and when set to a connection position by the data monitoring section 302a, it sends calibration data to the adaptive coding section 306.

Referring to FIG. 8A and FIG. 8B again, the configuration of the communication terminal apparatus according to this embodiment will be explained.

Based on a CIR reported from a base station apparatus (not shown) which is the station on the other end and a table 338, the MCS selection section 304 selects such an MCS that the error rate at the base station apparatus satisfies a desired error rate. Furthermore, when calibration data is transmitted, the MCS selection section 304 selects MCS according to a predetermined procedure. The MCS selection section 304 informs the coding rate and modulation scheme of the selected MCS to the adaptive coding section 306 and adaptive modulation section 310 respectively and at the same time notifies the modulation section 308 and table rewriting section 336 that the MCS has been selected. The adaptive coding section 306 error-codes transmission data or calibration data at the coding rate selected by the MCS selection section 304.

The modulation section 308 modulates information on the MCS (MCS information) selected by the MCS selection section 304. The adaptive modulation section 310 modulates the transmission data or calibration data according to the modulation scheme of the MCS selected by the MCS selection section 304. The spreading section 312 spreads the MCS information. The spreading section 314 spreads the transmission data or calibration data. The multiplexing section 316 multiplexes the MCS information and transmission data or calibration data. The transmission RF section 318 carries out predetermined radio transmission processing (D/A conversion, up-conversion, etc.) on the multiplexed signal output from the multiplexing section 316 and transmits it from a duplexer 320 through an antenna.

The reception section is constructed of a reception RF section 322, a despreading section 324, a despreading section 326, a demodulation section 328, a demodulation section 330, a CIR decoding section 332 and an error rate decoding section 334.

The reception RF section 322 carries out predetermined radio reception processing (down-conversion, A/D conversion, etc.) on a received signal received from the antenna through the duplexer 320. The despreading section 324 despreads information on the CIR of the uplink measured by the base station apparatus included in the received signal. The despreading section 326 despreads information on the error rate of data transmitted on the uplink included in the received signal. The demodulation section 328 demodulates the information on the CIR of the uplink.

The demodulation section 330 demodulates the information on the error rate of the uplink. The CIR decoding section 332 decodes the information on the CIR of the uplink and notifies the CIR obtained to the MCS selection section 304 and table rewriting section 336. The error rate decoding section 334 decodes the information on the data error rate transmitted on the uplink and notifies the error rate obtained to the table rewriting section 336.

The table updating section is constructed of the table rewriting section 336 and table 338.

The table rewriting section 336 compares the error rate with a predetermined threshold, and when the table 338 further needs to be updated as a result of the comparison or when the CIR and error rate of the calibration data are reported, the table rewriting section 336 rewrites the table 338. Here, examples of cases where the table 338 needs to be updated include a case where the error rate actually reported from the base station apparatus does not satisfy the desired error rate although the MCS capable of satisfying the desired error rate has been selected from the table 338 and the transmission data has been transmitted. Furthermore, that the error rate does not satisfy the desired error rate specifically means that although the table has been created in such a way that the error rate becomes 10%, the error rate falls below 10%, for example, 1% or contrarily the error rate exceeds 10%, for example, 20% when the data is actually transmitted.

Furthermore, when rewriting the table 338, the table rewriting section 336 rewrites the correspondence between the CIR and the error rate according to the MCS notified from the MCS selection section 304 (that is, MCS used for data transmission) based on the CIR decoded by the CIR decoding section 332 and the error rate decoded by the error rate decoding section 334 (that is, CIR and error rate reported from the base station apparatus).

The table 338 shows an MCS capable of satisfying a desired error rate associated with a CIR as with the prior art.

In this embodiment, the table 338 is updated based on the data error rate, but in addition to this, the embodiment may also be adapted in such a way that the table 338 is updated based on the result of a comparison between an index indicating transmission quality of data on the uplink such as a throughput and delay time with a predetermined threshold.

Then, the operation of the communication terminal apparatus in the above described configuration will be explained taking specific examples using FIG. 10A and FIG. 10B.

As described above, when there is no transmission data to be transmitted to the base station apparatus, the switching section 302 sends calibration data to the adaptive coding section 306.

Figures 10A, 10B:
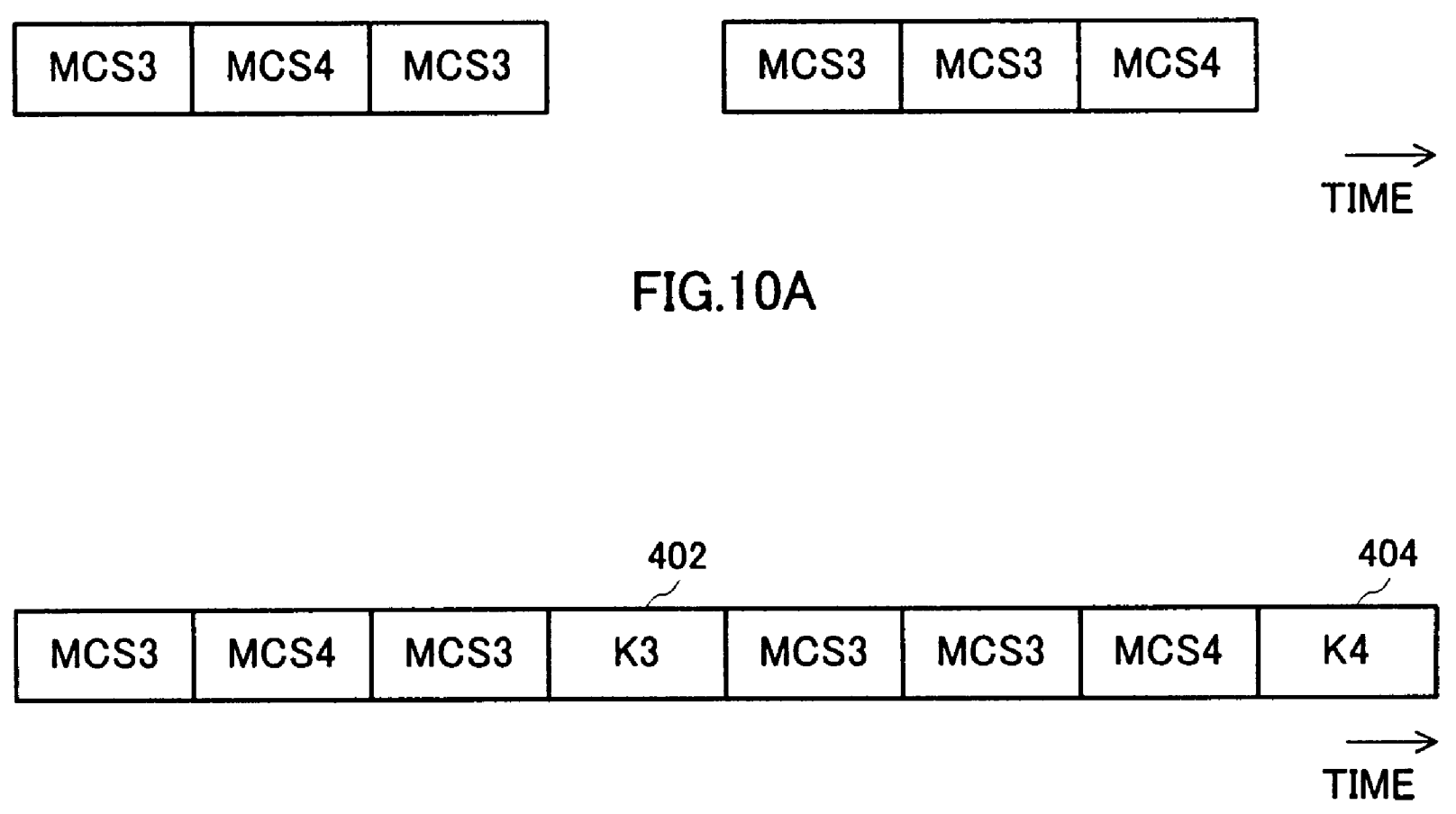

For example, as shown in FIG. 10A, suppose transmission data is transmitted in order of MCS3, MCS4, MCS3, (none), MCS3, MCS3, MCS4 and (none). MCS3 and MCS4 each indicate MCS used for transmission data and "(none)" means that there is no transmission data to be transmitted and the slot becomes empty.

Here, the data monitoring section 302a in the switching section 302 is always monitoring transmission data and when there is no transmission data to be transmitted (that is, in the case of (none) above), the switch 302b is set to a connection position.

When there is no transmission data to be transmitted, calibration data is sent to the adaptive coding section 306. In other words, calibration data is assigned to the slot which becomes empty because there is no transmission data to be sent and data is output from the switching section 302 to the adaptive coding section 306 sequentially starting from data on the left side with respect to the plane of the sheet in FIG. 10B. In FIG. 10B, data 402 and data 404 indicate calibration data transmitted using MCS3 and MCS4 respectively.

The MCS to be used for calibration data is selected by the MCS selection section 304, the coding rate and modulation scheme of the selected MCS are used by the adaptive coding section 306 and adaptive modulation section 310 and calibration data is thereby error-coded and modulated. Then, the calibration data is spread by the spreading section 314. Furthermore, the information on the MCS (MCS information) selected by the MCS selection section 304 is notified to the table rewriting section 336 and at the same time modulated by the modulation section 308 and spread by the spreading section 312.

As the calibration data, it is possible to use data made up of a random string and an error detection code and known data such as PN string, etc.

Then, the spread MCS information and calibration data are multiplexed by the multiplexing section 316, subjected to predetermined radio transmission processing (D/A conversion, up-conversion, etc.) by the transmission RF section 318 and transmitted from the antenna through the duplexer 320. The MCS information is transmitted through a control channel and calibration data is transmitted through a data channel.

The transmitted calibration data is received by the base station apparatus (not shown) and the base station apparatus (not shown) demodulates and decodes the calibration data based on the MCS information and transmits a broadcasting signal including a CIR which is transmission quality of the uplink and an error rate of calibration data to the communication terminal apparatus.

The broadcasting signal including the CIR and error rate transmitted from the base station apparatus is received from the antenna through the duplexer 320 and subjected to predetermined radio reception processing (down-conversion, A/D conversion, etc.) by the reception RF section 322. Then, the received signal is despread by the despreading section 324 and despreading section 326. Then, the received signal is demodulated by the demodulation section 328 and decoded by the CIR decoding section 332 and the CIR obtained is notified to the MCS selection section 304 and table rewriting section 336.

On the other hand, the signal despread by the despreading section 326 is demodulated by the demodulation section 330, decoded by the error rate decoding section 334 and the error rate obtained is notified to the table rewriting section 336. Then, the table rewriting section 336 updates the correspondence between the CIR and error rate according to the MCS notified from the MCS selection section 304 (that is, MCS used for transmission of calibration data) based on the CIR notified from the CIR decoding section 332 and the error rate notified from the error rate decoding section 334 (that is, actual CIR and error rate of the calibration data) and then updates the table 338.

As shown above, according to this embodiment, when there is no transmission data to be transmitted and an empty slot is produced, data is transmitted with calibration data for updating the MCS selection table assigned to the empty slot, and therefore it is possible for the base station apparatus which is the station on the other end to report the transmission quality and error rate of the uplink to the communication terminal apparatus and for the communication terminal apparatus to update the MCS selection table correctly according to the reported transmission quality and error rate and select an optimal MCS according to the actual channel condition.

Embodiment 3

A feature of Embodiment 3 of the present invention is that a communication terminal apparatus transmits calibration data periodically and selects MCS in an uplink communication.

The configuration of the communication terminal apparatus according to Embodiment 3 is the same as that of the communication terminal apparatus according to Embodiment 2 shown in FIG. 8A and FIG. 8B, and therefore explanations thereof will be omitted. However, in this embodiment, only the switching section 302 is different from that of Embodiment 2.

The switching section 302 outputs calibration data in a predetermined cycle irrespective of the presence/absence of transmission data.

Figure 11:
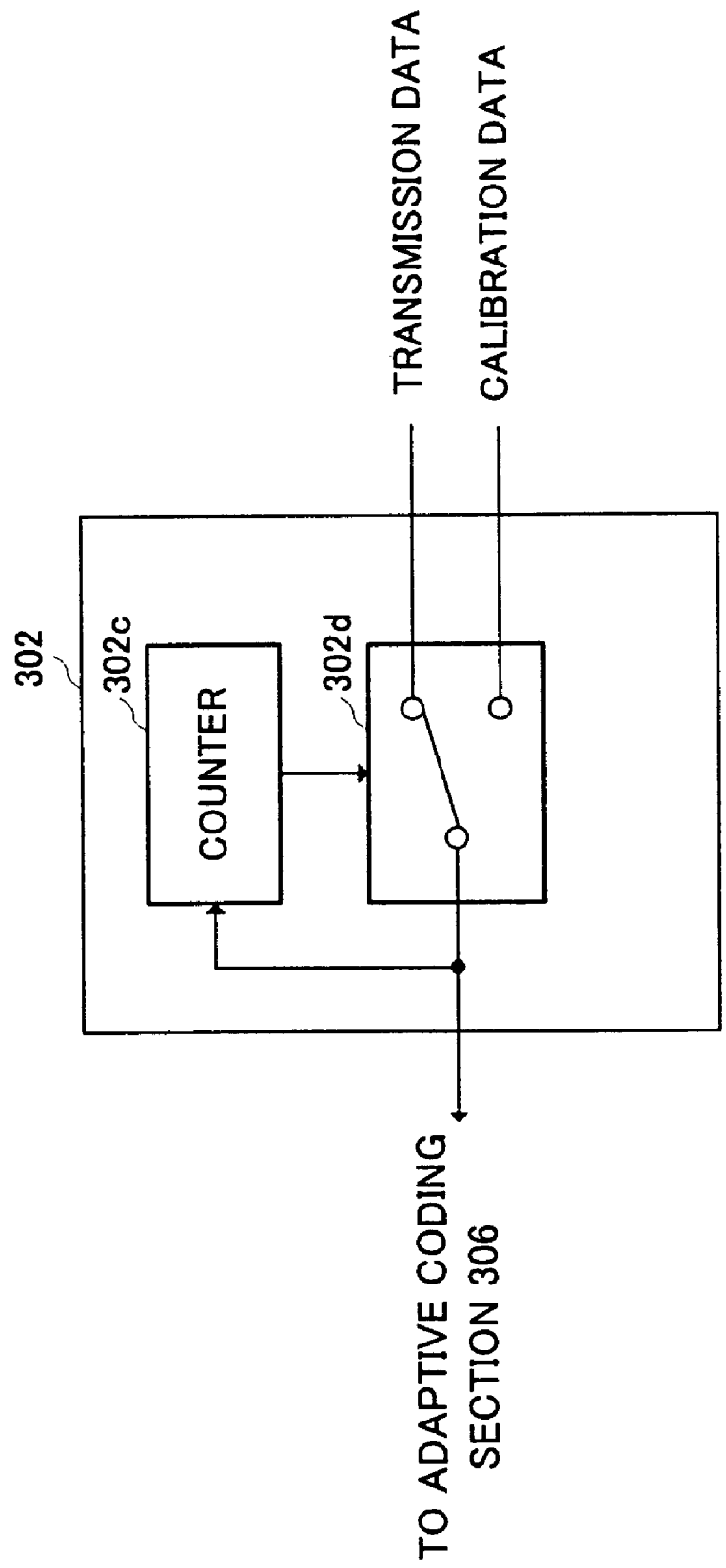
FIG. 11 is a block diagram showing a configuration of a switching section according to Embodiment 3 of the present invention.

FIG. 11 is a block diagram showing an internal configuration of the switching section 302 according to this embodiment.

As shown in FIG. 11, the switching section 302 includes a counter 302c and a switch 302d. The counter 302c measures transmission data sent from the switching section 302 and switches the switch 302d to the calibration data side every time the measured count reaches a predetermined count. The switch 302d is normally connected to the transmission data side and when switched to the calibration data side by the counter 302c, the switch 302d sends the calibration data to the adaptive coding section 306.

Then, the operation of transmitting calibration data by the communication terminal apparatus in the above described configuration will be explained with a specific example using FIG. 12.

As described above, the switching section 302 sends calibration data to the adaptive coding section 306 irrespective of the presence/absence of transmission data to be transmitted to the base station apparatus.

That is, the counter 302c in the switching section 302 measures the number of times transmission data is sent from the switch 302d and switches the switch 302d to the calibration data side every time the measured count reaches a predetermined count. When the calibration data is sent, the counter 302c switches the switch 302d to the transmission data side again.

Figure 12:
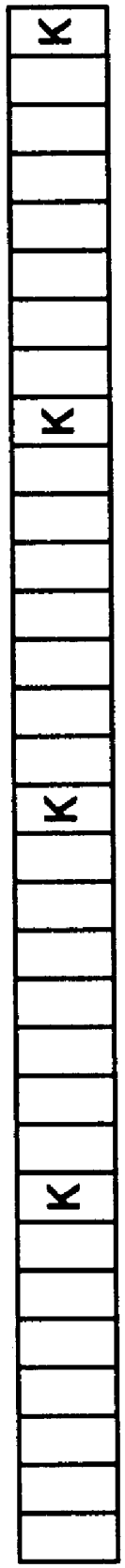
FIG. 12 illustrates an example of a data slot configuration according to Embodiment 3.

In this way, for example, as shown in FIG. 12, calibration data (indicated by "K" in the figure) is sent to the adaptive coding section 306 in a predetermined cycle (8-slot cycle in the figure).

In this way, this embodiment transmits calibration data for updating the MCS selection table periodically irrespective of the presence/absence of transmission data to be transmitted, and can thereby keep the MCS selection table in an accurate state more reliably and select an optimal MCS according to the actual channel condition.

Embodiment 4

A feature of Embodiment 4 of the present invention is to transmit calibration data using MCS according to a request from the receiving side instead of changing MCS used for transmission of calibration data in a predetermined sequence.

Figure 13A:
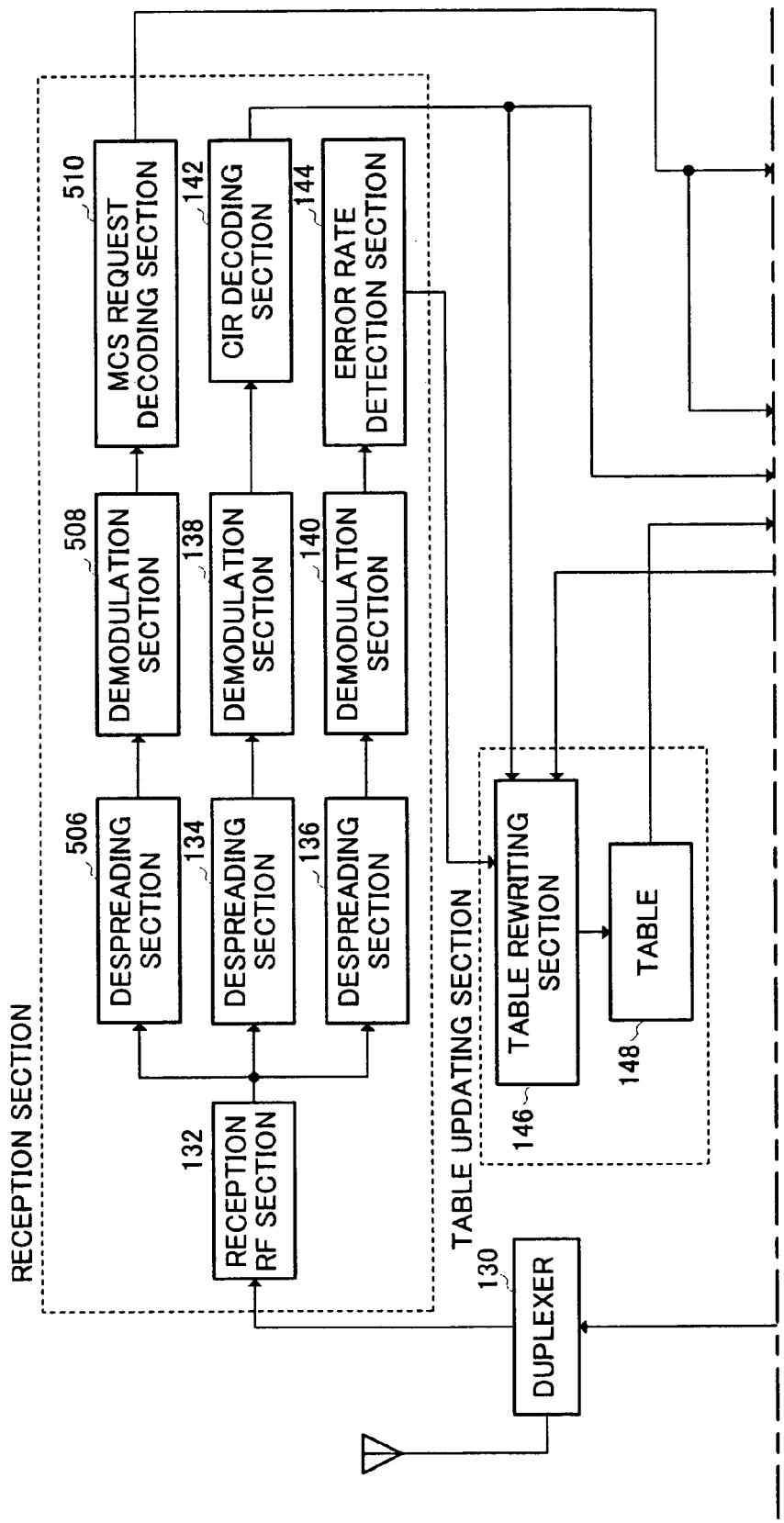
FIG. 13A is a block diagram showing a configuration of a base station apparatus according to Embodiment 4 of the present invention.
Figure 13B:
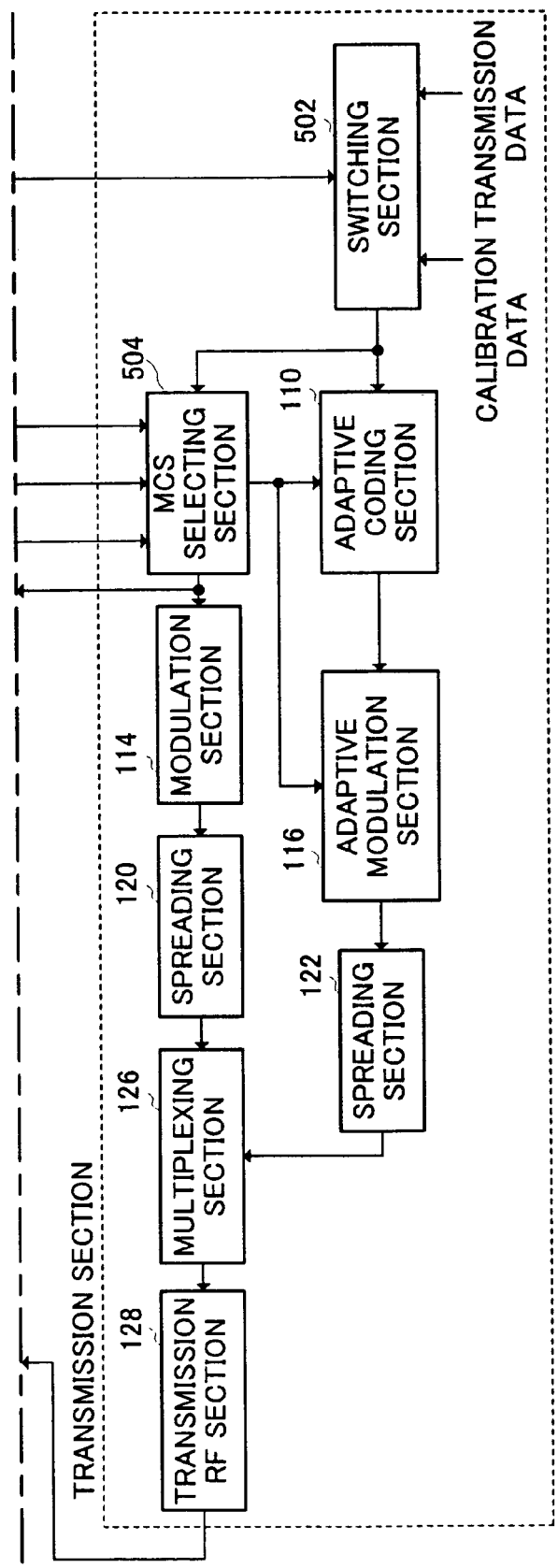
FIG. 13B illustrates a continuation of FIG. 13A.

FIG. 13A and FIG. 13B are block diagrams showing a configuration of a base station apparatus according to Embodiment 4. The base station apparatus shown in FIG. 13A and FIG. 13B is constructed of a transmission section, a reception section and a table updating section. In the base station apparatus shown in FIG. 13A and FIG. 13B, the same parts as those in the base station apparatus (Embodiment 1) shown in FIG. 3A and FIG. 3B are assigned the same reference numerals and explanations thereof will be omitted.

The transmission section is constructed of a switching section 502, an MCS selection section 504, an adaptive coding section 110, a modulation section 114, an adaptive modulation section 116, a spreading section 120, a spreading section 122, a multiplexing section 126 and a transmission RF section 128.

The switching section 502 switches between transmission data and calibration data and outputs the data to the adaptive coding section 110. More specifically, the switching section 502 normally sends transmission data, but when it receives a specific MCS request from an MCS request decoding section 510 in the reception section which will be described later, the switching section 502 temporarily stops sending of transmission data and sends calibration data. Furthermore, when calibration data is output, the switching section 502 notifies it to the MCS selection section 504.

Based on a CIR reported from a communication terminal apparatus which is the station on the other end and a table 148, the MCS selection section 504 selects such an MCS that the error rate at the communication terminal apparatus satisfies a desired error rate. Furthermore, when calibration data is transmitted, the MCS selection section 504 selects a specific MCS notified from the MCS request decoding section 510 which will be described later. The MCS selection section 504 informs the coding rate and modulation scheme of the selected MCS to the adaptive coding section 110 and adaptive modulation section 116 respectively and notifies the modulation section 114 and table rewriting section 146 that the MCS has been selected.

The reception section is constructed of a reception RF section 132, a despreading section 506, a despreading section 134, a despreading section 136, a demodulation section 508, a demodulation section 138, a demodulation section 140, an MCS request decoding section 510, a CIR decoding section 142 and an error rate decoding section 144.

The despreading section 506 despreads information requesting calibration data of a specific MCS included in a received signal. The demodulation section 508 demodulates the information requesting the specific MCS. The MCS request decoding section 510 decodes the information requesting the specific MCS and notifies the specific MCS included in this information to the switching section 502 and MCS selection section 504.

Figure 14:
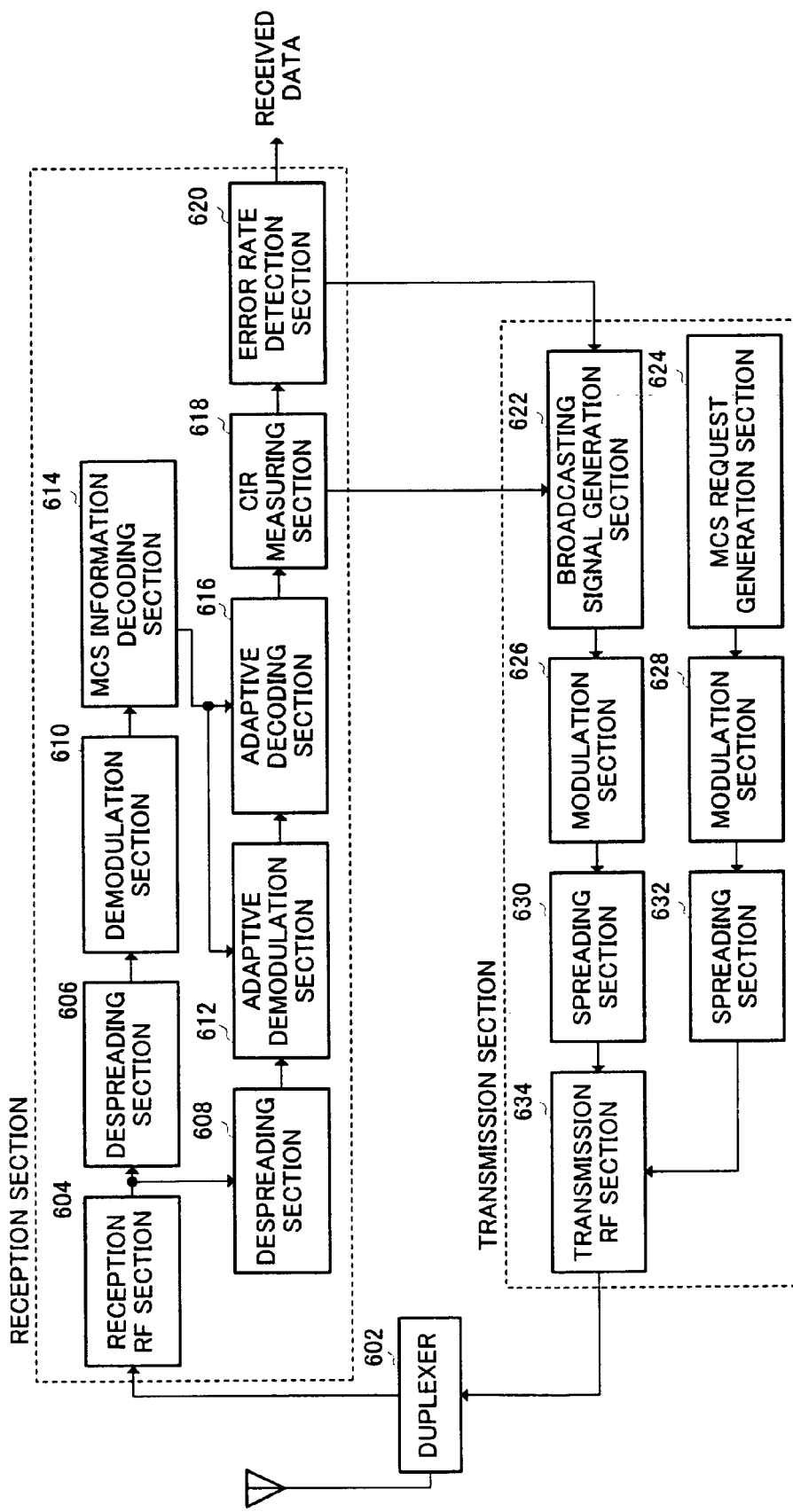
FIG. 14 is a block diagram showing a configuration of a communication terminal apparatus according to Embodiment 4 of the present invention.

FIG. 14 is a block diagram showing a configuration of a communication terminal apparatus according to Embodiment 4. The communication terminal apparatus shown in the same figure is constructed of a reception section and a transmission section.

The reception section is constructed of a reception RF section 604, a despreading section 606, a despreading section 608, a demodulation section 610, an adaptive demodulation section 612, an MCS information decoding section 614, an adaptive decoding section 616, a CIR measuring section 618 and an error rate detection section 620.

The reception RF section 604 carries out predetermined radio reception processing (down-conversion, A/D conversion, etc.) on a received signal received from an antenna through a duplexer 602. The despreading section 606 despreads information included in the received signal on MCS selected by the base station apparatus (MCS information). The despreading section 608 despreads data or calibration data included in the received signal. The demodulation section 610 demodulates the MCS information. The adaptive demodulation section 612 demodulates the data or calibration data according to the demodulation scheme corresponding to the modulation scheme of the MCS notified from the MCS information decoding section 614.

The MCS information decoding section 614 decodes the MCS information and informs the coding rate and modulation scheme of the MCS obtained (that is, MCS used for transmission of data or calibration data) to the adaptive demodulation section 612 and adaptive decoding section 616 respectively. The adaptive decoding section 616 error-decodes the data or calibration data based on the coding rate of the MCS notified from the MCS information decoding section 614.

The CIR measuring section 618 measures a CIR of the data or calibration data and notifies the CIR to a broadcasting signal generation section 622 in the transmission section which will be described later. The error rate detection section 620 detects an error rate of data or calibration data, notifies the error rate to the broadcasting signal generation section 622 in the transmission section which will be described later and outputs the decoded received data.

The transmission section is constructed of a broadcasting signal generation section 622, an MCS request generation section 624, a modulation section 626, a modulation section 628, a spreading section 630, a spreading section 632 and a transmission RF section 634.

The broadcasting signal generation section 622 generates a broadcasting signal for broadcasting the CIR measured by the CIR measuring section 618 and the error rate detected by the error rate detection section 620 to the base station apparatus.

The MCS request generation section 624 generates an MCS request signal for requesting calibration data of a specific MCS. More specifically, for example, MCS information decoded by the MCS information decoding section 614 is stored in a memory (not shown), the MCS request generation section 624 generates an MCS request signal requesting calibration data of MCS not used for more than a predetermined period of time.

The modulation section 626 modulates the broadcasting signal including the CIR and error rate of the data or calibration data. The modulation section 628 modulates the MCS request signal requesting calibration data of the specific MCS. The spreading section 630 spreads the broadcasting signal. The spreading section 632 spreads the MCS request signal. The transmission RF section 634 carries out predetermined radio transmission processing (D/A conversion, up-conversion, etc.) on the broadcasting signal or MCS request signal and transmits the signal from a duplexer 602 through an antenna.

Then, the operations of the base station apparatus and communication terminal apparatus in the above described configurations will be explained.

First, the operations from requesting of calibration data by the communication terminal apparatus until transmission of the calibration data by the base station apparatus will be explained.

The MCS request generation section 624 of the communication terminal apparatus generates an MCS request signal requesting calibration data of a specific MCS, for example, MCS not used for a long period of time. The MCS request signal generated is modulated by the modulation section 628, spread by the spreading section 632 and transmitted through the transmission RF section 634, duplexer 602 and antenna.

The MCS request signal is received from the antenna of the base station apparatus through the duplexer 130, subjected to predetermined radio reception processing by the reception RF section 132, and then despread by the despreading section 506. Then, the MCS request signal is demodulated by the demodulation section 508 and decoded by the MCS request decoding section 510. As a result of the decoding of the MCS request signal, the MCS requested by the communication terminal apparatus is notified to the switching section 502 and MCS selection section 504.

Upon reception of this notification, the switching section 502 sends calibration data to the adaptive coding section 110 and the MCS selection section 504 informs the coding rate and modulation scheme of the requested MCS to the adaptive coding section 110 and adaptive modulation section 116. The calibration data is error-coded and modulated by the adaptive coding section 110 and adaptive modulation section 116 respectively and spread by the spreading section 122.

On the other hand, the MCS selected by the MCS selection section 504 is notified to the table rewriting section 146 and at the same time modulated as MCS information by the modulation section 114. At this time, information on the selected MCS may be used as the MCS information, but when calibration data is transmitted, based on, for example, a table shown in FIG. 15, a value indicating that calibration data is transmitted ("0" in the figure) may also be used as the MCS information.

According to this embodiment, when calibration data is transmitted, MCS selected by the MCS selection section 504 is the MCS requested from the communication terminal apparatus, and therefore the MCS need not be notified to the communication terminal apparatus again through the MCS information. Therefore, as described above, even when the information that calibration data is transmitted is used as the MCS information, the communication terminal apparatus can perform demodulation and error decoding according to the MCS used for the received calibration data.

The MCS information is modulated by the modulation section 114, spread by the spreading section 120 and multiplexed with the calibration data by the multiplexing section 126. The multiplexed signal resulting from the multiplexing is subjected to predetermined radio transmission processing by the transmission RF section 128 and transmitted from the antenna through the duplexer 130. The MCS information and address information are transmitted through a control channel, while calibration data is transmitted through a data channel.

Then, the operations from reception of calibration data by the communication terminal apparatus until updating of the table by the base station apparatus will be explained.

The calibration data and the corresponding MCS information are received from the antenna through the duplexer 602 of the communication terminal apparatus, subjected to predetermined radio reception processing by the reception RF section 604, the MCS information is despread by the despreading section 606 and the calibration data is despread by the despreading section 608.

The despread MCS information is demodulated by the demodulation section 610, decoded by the MCS information decoding section 614 and the modulation scheme and coding rate of the MCS obtained are informed to the adaptive demodulation section 612 and adaptive decoding section 616 respectively. At this time, as described above, when the information that calibration data has been transmitted as the MCS information, the modulation scheme and coding rate of the MCS requested by the MCS request generation section 624 can be informed respectively.

The despread calibration data is demodulated by the adaptive demodulation section 612 and error-decoded by the adaptive decoding section 616. These demodulation and error-decoding are carried out according to the modulation scheme and coding rate of the MCS notified by the MCS information.

Then, the CIR measuring section 618 measures the CIR of the calibration data, the error rate detection section 620 detects the error rate of the calibration data, and when the calibration data is advertisement data, etc., the decoding result is output as received data.

Furthermore, the CIR and error rate of the calibration data are output to the broadcasting signal generation section 622, where a broadcasting signal is generated. The broadcasting signal is modulated by the modulation section 626, spread by the spreading section 630 and transmitted through the transmission RF section 634, duplexer 602 and antenna.

The broadcasting signal is received from the antenna of the base station apparatus through the duplexer 130, subjected to predetermined radio reception processing by the reception RF section 132, despread by the despreading section 134 and despreading section 136 and demodulated by the demodulation section 138 and demodulation section 140. Then, the CIR of the calibration data included in the broadcasting signal is decoded by the CIR decoding section 142 and notified to the table rewriting section 146. Furthermore, the error rate of the calibration data included in the broadcasting signal is decoded by the error rate decoding section 144 and notified to the table rewriting section 146.

Then, the table rewriting section 146 updates the correspondence between the CIR and the error rate according to the MCS notified from the MCS selection section 504 (that is, the MCS used for transmission of the calibration data is selected) based on the CIR notified from the CIR decoding section 142 and the error rate notified from the error rate decoding section 144 (that is, actual CIR and error rate of the calibration data) and updates the table 148 corresponding to the communication terminal apparatus which has transmitted the broadcasting signal.

Thus, according to this embodiment, when requested from the communication terminal apparatus, the base station apparatus transmits calibration data using the MCS requested from the communication terminal apparatus, and therefore it is possible to update the MCS selection table for the MCS required by the communication terminal apparatus and update the MCS selection table thoroughly, transmit only minimum necessary calibration data and reduce the influence of the calibration data on the channel capacity.

Furthermore, when calibration data is transmitted, if the MCS information is assumed to be information that calibration data is transmitted instead of information on the MCS, it is not necessary to notify the MCS of the calibration data, and therefore it is possible to divert the corresponding channel capacity to data transmission and thereby improve the throughput of data transmission.

Embodiment 5

A feature of Embodiment 5 of the present invention is that the receiving side of calibration data updates an MCS selection table using the error rate of the calibration data received.

Figure 16:
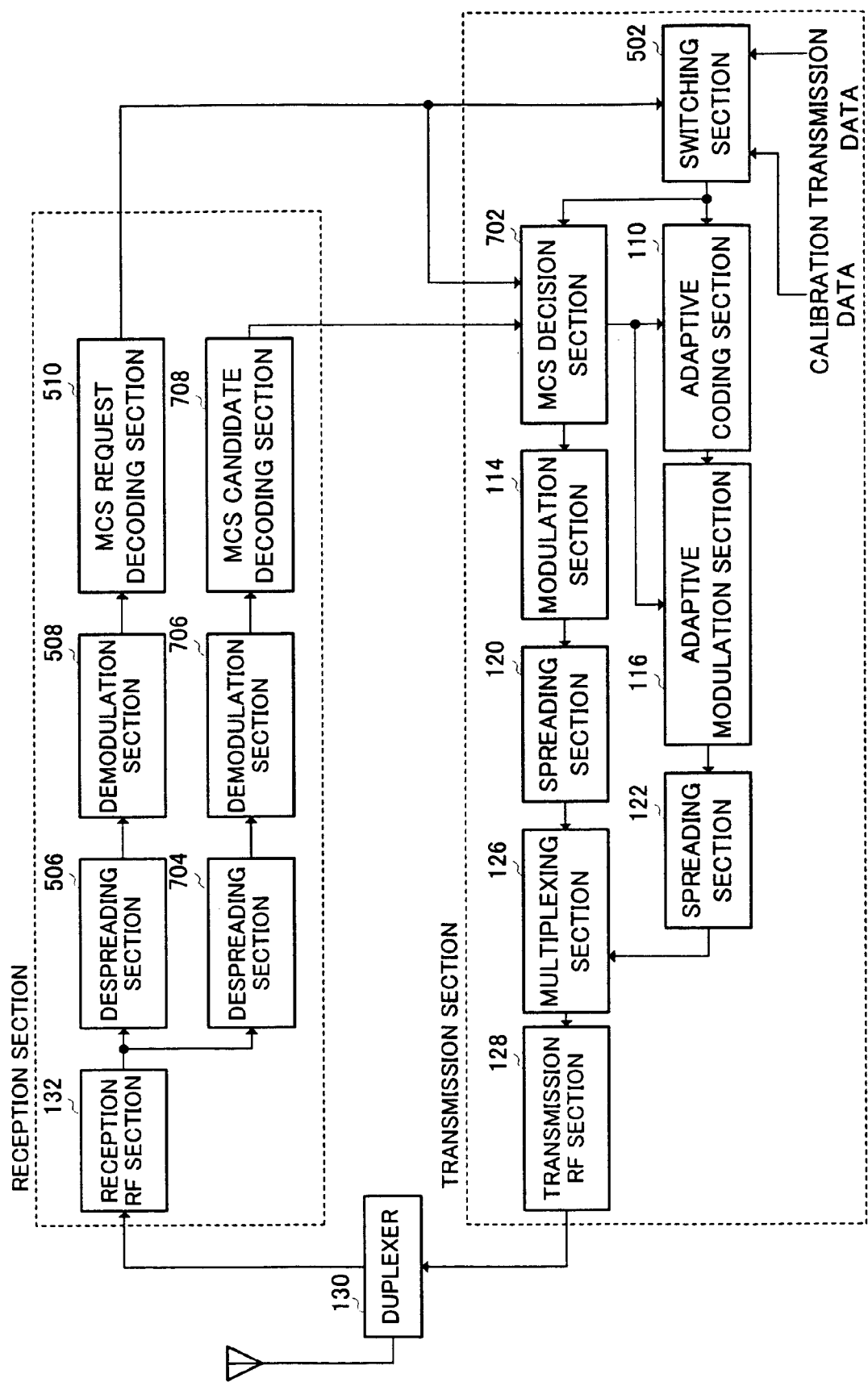
FIG. 16 is a block diagram showing a configuration of a base station apparatus according to Embodiment 5 of the present invention.

FIG. 16 is a block diagram showing a configuration of a base station apparatus according to Embodiment 5. The base station apparatus shown in the same figure is constructed of a transmission section and a reception section. In the base station apparatus shown in FIG. 16, the same parts as those of the base station apparatus (Embodiment 1 and Embodiment 4) shown in FIG. 3A and FIG. 3B, and FIG. 13A and FIG. 13B are assigned the same reference numerals and explanations thereof will be omitted.

The transmission section is constructed of a switching section 502, an MCS decision section 702, an adaptive coding section 110, a modulation section 114, an adaptive modulation section 116, a spreading section 120, a spreading section 122, a multiplexing section 126, and a transmission RF section 128.

The MCS decision section 702 decides MCS to be actually used from among MCS candidates notified from an MCS candidate decoding section 708 of the reception section which will be described later. Furthermore, when the calibration data is transmitted, the MCS decision section 702 decides a specific MCS notified from the MCS request decoding section as the MCS to be actually used. The MCS decision section 702 informs the coding rate and modulation scheme of the decided MCS to the adaptive coding section 110 and adaptive modulation section 116 and notifies the modulation section 114 that the MCS has been decided.

The reception section is constructed of a reception RF section 132, a despreading section 506, a despreading section 704, a demodulation section 508, a demodulation section 706, an MCS request decoding section 510 and an MCS candidate decoding section 708.

The despreading section 704 despreads information included in the received signal on an MCS candidate used when data is transmitted. The demodulation section 706 demodulates the information on the MCS candidate. The MCS candidate decoding section 708 decodes the information on the MCS candidate and notifies the MCS candidate obtained to the MCS decision section 702.

Figure 17A:
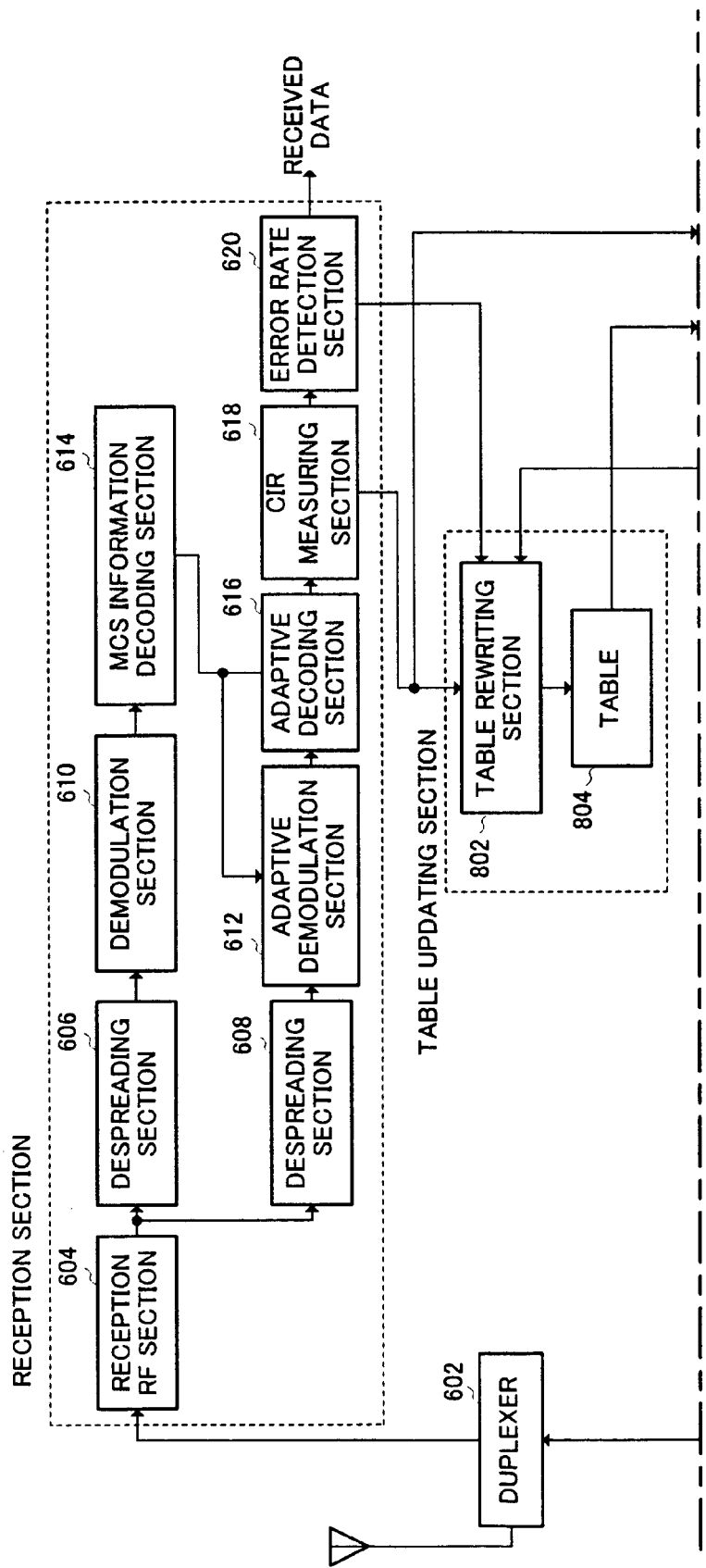
FIG. 17A is a block diagram showing a configuration of a communication terminal apparatus according to Embodiment 5.
Figure 17B:
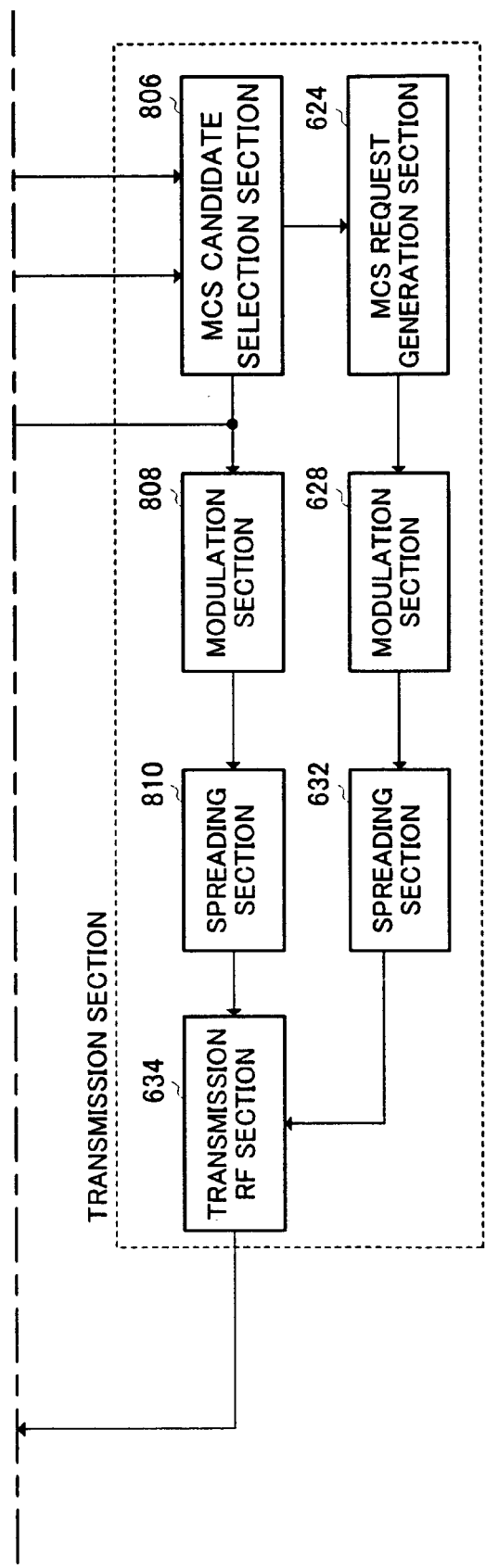
FIG. 17B illustrates a continuation of FIG. 17A.

FIG. 17A and FIG. 17B are block diagrams showing a configuration of a communication terminal apparatus according to Embodiment 5. The communication terminal apparatus shown in the same figure is constructed of a reception section, a table updating section and a transmission section. In the communication terminal apparatus shown in FIG. 17A and FIG. 17B, the same parts as those of the communication terminal apparatus (Embodiment 4) shown in FIG. 14 are assigned the same reference numerals and explanations thereof will be omitted.

The table updating section is constructed of a table rewriting section 802 and a table 804.

The table rewriting section 802 compares the error rate with a predetermined threshold and when the table 804 needs to be updated as a result or when the CIR and error rate of the received calibration data are notified, the table rewriting section 802 rewrites the table 804. Here, examples of the case where the table 804 needs to be updated include a case where although an MCS capable of satisfying the desired error rate is selected from the table 804 and notified to the base station apparatus as the MCS candidate, the error rate of the data actually transmitted from the base station apparatus does not satisfy the desired error rate.

Furthermore, when the table 804 is rewritten, the table rewriting section 802 rewrites the correspondence between the CIR and the error rate according to the MCS notified from the MCS candidate selection section 806 (that is, MCS candidate used for transmission of data from the base station apparatus) based on the CIR measured by the CIR measuring section 618 and the error rate detected by the error rate detection section 620 (that is, the CIR and error rate of the actually received data).

This embodiment can also be adapted in such a way that the MCS obtained by the MCS information decoding section 614 is notified to the table rewriting section 802 and the table rewriting section 802 rewrites the correspondence between the CIR and the error rate according to the MCS notified from the MCS information decoding section 614 (that is, MCS used for transmission of data actually transmitted from the base station apparatus).

The table 804 shows an MCS capable of satisfying a desired error rate associated with a CIR as with the prior art.

The transmission section is constructed of an MCS candidate selection section 806, an MCS request generation section 624, a modulation section 808, a modulation section 628, a spreading section 810, a spreading section 632 and a transmission RF section 634.

The MCS candidate selection section 806 selects such an MCS that the error rate at the own apparatus satisfies a desired error rate as an MCS candidate based on the CIR of the data transmitted from the base station apparatus and the table 804. Furthermore, the MCS candidate selection section 806 stores the selected MCS candidate, for example, and notifies an MCS which is not selected as an MCS candidate for a time longer than a predetermined period of time as a specific MCS to the MCS request generation section 624 so as to generate an MCS request signal.

The modulation section 808 modulates the MCS candidate selected by the MCS candidate selection section 806. The spreading section 810 spreads the MCS candidate.

Then, the operations of the base station apparatus and the communication terminal apparatus in the above described configurations will be explained.

The operations from requesting of calibration data by the communication terminal apparatus until transmission of the calibration data by the base station apparatus are the same as those in Embodiment 4, and therefore explanations thereof will be omitted.

Thus, the operation from reception of calibration data until updating of the table and transmission of an MCS candidate by the communication terminal apparatus will be explained first.

The calibration data and the corresponding MCS information are despread and demodulated respectively as in the case of Embodiment 4 and the CIR and error rate of the calibration data are output to the table rewriting section 802. Furthermore, the CIR is also output to the MCS candidate selection section 806.

Then, the table rewriting section 802 updates the correspondence between the CIR and the error rate according to the MCS candidate notified from the MCS candidate selection section 806 (or MCS notified from the MCS information decoding section 614) based on the CIR notified from the CIR measuring section 618 and the error rate notified from the error rate detection section 620 (that is, the CIR and error rate of the received calibration data) and updates the table 804.

On the other hand, when the CIR measured by the CIR measuring section 618 is output to the MCS candidate selection section 806, the table 804 is referenced based on the CIR and MCS capable of satisfying a desired error rate is selected as an MCS candidate. The information on the selected MCS candidate is modulated by the modulation section 808, spread by the spreading section 810 and transmitted through the transmission RF section 634, duplexer 602 and antenna.

Then, the operation from reception of an MCS candidate until decision of MCS by the base station apparatus will be explained.

The information on the MCS candidate is received from the antenna of the base station apparatus through the duplexer 130, subjected to predetermined radio reception processing by the reception RF section 132, despread by the despreading section 704 and demodulated by the demodulation section 705.

The information on the demodulated MCS candidate is decoded by the MCS candidate decoding section 708 and the MCS candidate obtained is notified to the MCS decision section 702. Then, the MCS decision section 702 decides whether the MCS candidate should be the MCS to be actually used or not and the MCS to be used for data transmission is finally decided.

In this way, this embodiment updates the MCS selection table of the communication terminal apparatus based on the transmission quality and the error rate of the calibration data received by the communication terminal apparatus, and can thereby update the MCS selection table correctly and select an optimal MCS according to an actual channel condition even when the communication terminal apparatus has an MCS selection table used for data transmission from the base station apparatus to the communication terminal apparatus.

The foregoing embodiments have described communications between a base station apparatus and a communication terminal apparatus for convenience, but the present invention is also applicable to communications between base station apparatuses or communications between communication terminal apparatuses.

In Embodiments 4 and 5 above, the base station apparatus switches between transmission data and calibration data according to a request from the communication terminal apparatus and transmits the data, but the present invention can also be adapted so as to transmit calibration data when there is an empty slot or periodically as in the case of Embodiments 1 to 3. In that case, it is possible to temporarily store the MCS requested from the communication terminal apparatus and read the stored MCS at transmission timing of calibration data.

As described, the present invention can update a communication mode selection table correctly and select an optimal MCS according to the actual channel condition.

This application is based on the Japanese Patent Application No. 2002-189881 filed on Jun. 28, 2002, the Japanese Patent Application No. 2002-238820 filed on Aug. 20, 2002 and the Japanese Patent Application No. 2003-158416 filed on Jun. 3, 2003, entire content of which is expressly incorporated by reference herein.

INDUSTRIAL APPLICABILITY

The present invention is applicable to a transmission apparatus and method for updating a communication mode selection table.

What is claimed is:

1. A transmission apparatus in a radio communication system using a communication mode selection table for selecting a communication mode according to a channel condition, said table being provided from a correspondence relationship between a carrier to interference ratio and an error rate for each modulation coding scheme and indicating a correspondence relationship between the communication mode and the carrier to interference ratio, the transmission apparatus comprising:
    a transmission section that transmits calibration data for updating the communication mode selection table; and
    a table rewriting section that changes the correspondence relationship between the carrier to interference ratio and the error rate in the communication mode based on the error rate when the transmitted calibration data is transmitted through a communication channel, and rewrites the correspondence relationship between the communication mode and the carrier to interference ratio by the change; and
    a decision section that decides the communication mode for transmitting data based on the rewritten communication mode selection table, wherein:
    the calibration data is assigned to a slot which becomes empty as a result of scheduling, and
    when an error rate of the calibration data does not satisfy a desired error rate, the table rewriting section rewrites the correspondence relationship between the communication mode and the carrier to interference ratio based on the error rate of the calibration data and the carrier to interference ratio.

2. The transmission apparatus according to claim 1, wherein said decision section comprises:
    a reception section that receives information including transmission quality when the calibration data is transmitted through a communication channel; and
    an updating section that updates the communication mode selection table based on received information including the transmission quality, and decides a communication mode for actually transmitting data from the updated communication mode selection table.

3. The transmission apparatus according to claim 1, wherein said decision section comprises a reception section that receives information including communication mode candidates selected from the communication mode selection table which is owned by the station on the other end and updated based on the transmission quality of calibration data, and decides a communication mode for actually transmitting data from the received communication mode candidates.

4. The transmission apparatus according to claim 1, wherein said transmission section inserts calibration data in an empty slot and transmits the calibration data.

5. The transmission apparatus according to claim 1, wherein said transmission section inserts calibration data in every predetermined number of slots and transmits the calibration data.

6. The transmission apparatus according to claim 1, wherein said transmission section transmits calibration data to all stations on the other end which communicate with said transmission apparatus.

7. The transmission apparatus according to claim 1, wherein said transmission section transmits calibration data to a station on the other end which requests transmission of calibration data.

8. The transmission apparatus according to claim 1, wherein said transmission section transmits address information indicating the transmission destination of calibration data.

9. The transmission apparatus according to claim 1, wherein said transmission section transmits calibration data by changing a communication mode periodically.

10. The transmission apparatus according to claim 1, wherein said transmission section transmits calibration data in a communication mode requested by the station on the other end.

11. The transmission apparatus according to claim 10, wherein when said calibration data is transmitted, said transmission section transmits information indicating that calibration data is transmitted as communication mode information for notifying a communication mode of said calibration data.

12. The transmission apparatus according to claim 1, wherein said transmission section transmits calibration data including data of a random string and error detection code.

13. The transmission apparatus according to claim 1, wherein said transmission section transmits data known to the station on the other end as calibration data.

14. The transmission apparatus according to claim 1, wherein said transmission section transmits calibration data including data unnecessary for the station on the other end.

15. A base station apparatus provided with the transmission apparatus according to claim 1.

16. A communication terminal apparatus provided with the transmission apparatus according to claim 1.

17. A method for updating a communication mode selection table in a radio communication system that uses the communication mode selection table for selecting a communication mode according to a channel condition, said table being provided from a correspondence relationship between a carrier to interference ratio and an error rate for each modulation coding scheme and indicating a correspondence relationship between the communication mode and the carrier to interference ratio, the method comprising:

a step of transmitting via a transmitter, calibration data for updating the communication mode selection table;

a step of changing the correspondence relationship between the carrier to interference ratio and the error rate in the communication mode based on the error rate when the transmitted calibration data is transmitted through a communication channel, and rewriting the correspondence relationship between the communication mode and the carrier to interference ratio by the change; and a step of deciding the communication mode for transmitting data based on the rewritten communication mode selection table, wherein:

the calibration data is assigned to a slot which becomes empty as a result of scheduling, and the step of rewriting the correspondence relationship includes rewriting the correspondence relationship between the communication mode and the carrier to interference ratio based on an error rate of the calibration data and the carrier to interference ratio when the error rate of the calibration data does not satisfy a desired error rate.

\* \* \* \* \*

UNITED STATES PATENT AND TRADEMARK OFFICE
CERTIFICATE OF CORRECTION

| | | |
|---|---|---|
| PATENT NO. | : 7,542,433 B2 | Page 1 of 1 |
| APPLICATION NO. | : 10/488754 | |
| DATED | : June 2, 2009 | |
| INVENTOR(S) | : Kenichi Miyoshi et al. | |

It is certified that error appears in the above-identified patent and that said Letters Patent is hereby corrected as shown below:

On the Title Page:

The title of the Letters Patent incorrectly reads:

"TRANSMISSION APPARATUS AND COMMUNICATION MODE SELECTION TABLE UPDATING METHOD"

and should read:

Item "(54) TRANSMISSION APPARATUS AND METHOD FOR UPDATING COMMUNICATION MODE SELECTION TABLE"

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,542,433 B2 |
| APPLICATION NO. | : 10/488754 |
| DATED | : June 2, 2009 |
| INVENTOR(S) | : Kenichi Miyoshi et al. |

It is certified that error appears in the above-identified patent and that said Letters Patent is hereby corrected as shown below:

On the Title Page, Item (54) and at Column 1, lines 1-3:

The title of the Letters Patent incorrectly reads:

"TRANSMISSION APPARATUS AND COMMUNICATION MODE SELECTION TABLE UPDATING METHOD"

and should read:

"TRANSMISSION APPARATUS AND METHOD FOR UPDATING COMMUNICATION MODE SELECTION TABLE"

This certificate supersedes the Certificate of Correction issued September 28, 2010.

Signed and Sealed this

Ninth Day of November, 2010

David J. Kappos
*Director of the United States Patent and Trademark Office*